US006246466B1

(12) United States Patent
Hirano et al.

(10) Patent No.: US 6,246,466 B1
(45) **Date of Patent: *Jun. 12, 2001**

(54) SHEET PACK AND RECORDING APPARATUS

(75) Inventors: Hirofumi Hirano, Zama; Tetsuji Kurata, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,824

(22) Filed: Feb. 19, 1999

(30) Foreign Application Priority Data

Feb. 25, 1998 (JP) ........................................ 10-060636
May 28, 1998 (JP) ........................................ 10-148125

(51) Int. Cl.[7] ........................................ G03B 27/00
(52) U.S. Cl. ........................ 355/407; 399/393; 271/145
(58) Field of Search ........................ 355/23, 24, 27, 355/72, 75, 407; 358/401; 399/364, 361, 363, 377, 391, 393, 394; 271/145

(56) References Cited

U.S. PATENT DOCUMENTS

| | | | | |
|---|---|---|---|---|
| 4,037,953 | * | 7/1977 | Sone et al. | 355/45 |
| 4,348,101 | * | 9/1982 | Schonfeld | 355/14 R |
| 5,023,658 | * | 6/1991 | Toyama et al. | 355/72 |
| 5,029,838 | * | 7/1991 | Kunihiro | 271/119 |
| 5,060,010 | * | 10/1991 | Ogura | 355/27 |
| 5,317,365 | * | 5/1994 | Tschiderer et al. | 355/75 |
| 5,653,435 | * | 8/1997 | Yoneda | 271/145 |

* cited by examiner

*Primary Examiner*—Safet Metjahic
*Assistant Examiner*—E P LeRoux
(74) *Attorney, Agent, or Firm*—Fitzpatrick, Cella, Harper & Scinto

(57) ABSTRACT

In a sheet pack hermetically containing sheets to be supplied to a recording apparatus in a box-shaped container, the container is provided with a plurality of feeding ports and a plurality of bearing ports for a sheet feeding device provided on the recording apparatus body side to feed the sheets from the feeding ports to bear against the sheets.

26 Claims, 21 Drawing Sheets

SHEET PACK AND RECORDING APPARATUS

BACKGROUND OF THE INVENTION

1. Field of the Invention

This invention relates to a printer connected to an information terminal unit such as a personal computer, an image pickup apparatus, a television receiver or a set top box for printing data transmitted from the information terminal unit, and particularly to a sheet pack removably mounted on the printer and stacking and containing print sheets thereon, and a printer for mounting the sheet pack thereon.

2. Related Background Art

Heretofore, in a printer connected to a personal computer or an image pickup apparatus for printing the data of the personal computer or the image pickup apparatus on a print sheet, a packing bag containing a bundle of print sheets therein has been opened and the print sheets have been set and printed one by one at a sheet feeding port of the printer, or a desired number of print sheets have been stacked and printed on a sheet feeding portion of the printer.

Also, depending on the kinds of the printer, there is one designed such that a sheet stacking and containing device (a so-called sheet cassette) for stacking and containing print sheets thereon is removably mounted on a printer body. When the sheet cassette is to be mounted on the printer body, a user stacks print sheets in the sheet cassette, and thereafter mounts the sheet cassette in a cassette mounting port formed in the printer body.

A design is made such that the print sheets stacked and contained in the sheet cassette are fed into a recording portion in the printer body while being separated one by one by a sheet feeding roller and a separating pad or the like after the sheet cassette has been mounted in the cassette mounting port.

Such a printer according to the earlier technology, however, in any case, has suffered from the problem of being cumbersome in that the packing bag containing the bundle of print sheets therein must be opened and the print sheets must be taken out one by one and set in the sheet feeding port of the printer or a necessary number of print sheets must be taken out of the opened packing bag and be stacked on the sheet feeding portion of the printer.

Also, there has been the problem of cumbersomeness that when the sheet cassette is to be removably mounted on the printer body, the sheet cassette must be once removed from the printer body and the packing bag containing a bundle of print sheets therein must likewise be opened and a necessary number of print sheets must be taken out of the opened packing bag and be stacked in the sheet cassette, which must then be mounted in the cassette mounting port.

Further, when a suitable number of print sheets are contained in the sheet cassette, the number of the print sheets contained in the sheet cassette is unknown to the user and the number of the remaining sheets is also unclear and therefore, there is a case where the print sheets become exhausted in the course of print output. When the print sheets thus become exhausted in the course of print output, the sheet cassette must be removed from the printer body and the packing bag containing a bundle of print sheets therein must be again opened and a necessary or suitable number of print sheets must be taken out of the opened packing bag and be contained in the sheet cassette, whereafter the sheet cassette must be mounted in the cassette mounting port of the printer body and also, an operation for containing the printing must be applied to the printer body or an information terminal apparatus such as a personal computer, and this is very cumbersome.

Also, the printer body and the information terminal apparatus for transmitting data to the printer cannot discriminate between the qualities of paper of the print sheets and therefore, when print sheets unsuitable for the purpose of printing or print data are contained in the sheet pack or are stacked on the print sheet feeding portion or are set in the sheet feeding port, printing is effected on those print sheets, and this leads to the problem that a desired print result is not obtained.

Further, the printer body and the information terminal apparatus for transmitting data to the printer cannot discriminate between the sizes of the print sheets and therefore effects printing on print sheets of a size differing from a desired size, and this also leads to the problem that a desired print result is not obtained.

SUMMARY OF THE INVENTION

It is an object of the present invention to provide a sheet pack which can simply set recording sheets on a recording apparatus and can also cope with various recording apparatuses in which the directions or the like of setting of sheets differ from one another.

It is also an object of the present invention to provide a recording apparatus designed to be capable of reading information regarding sheets contained in a sheet pack and information regarding the recording means of the recording apparatus and effecting optimum recording.

The sheet pack of the present invention is a sheet pack hermetically containing sheets to be supplied to a recording apparatus in a box-shaped container, characterized in that said container is provided with a plurality of feeding ports, and a plurality of bearing ports for sheet feeding means provided on the apparatus body side to feed sheets from said feeding ports to bear against the sheets.

The invention relates to a sheet pack comprising a box-shaped container for enveloping sheets lest a user touches a surface, on which an image is to be formed, of the sheet such as a coated sheet for color image. The sheet pack itself can be mounted on a main body of a printer.

The invention is characterized in that the sheet pack has a plurality of feeding ports for feeding out a sheet therethrough and a plurality of bearing ports through which sheet feeding means (a feed roller) provided in the main body of the printer is brought into contact with the sheet. The reason for providing the plurality of feeding ports and pack on the main body of the printer with different orientations of the sheet pack with respect to the main body of the printer with different orientations of the sheet pack with respect to the main body of the printer.

For example, the sheet pack 11 can be mounted on the main body of the printer in any directions indicated by the arrows A and B in FIG. 2.

The sheet pack 111 can be mounted on the main body of the printer even if the sheet pack 111 is turned upside-down as shown in FIG. 8.

The sheet pack 211 can be mounted on the main body of the printer from any one of two sides adjacent to each other (in any directions indicated by the arrows C and D) as shown in FIG. 11.

DESCRIPTION OF THE PREFERRED EMBODIMENTS

Some preferred embodiments of the present invention will hereinafter be described in-detail with reference to the drawings. As regards the dimensions, materials, shapes, relative disposition, etc. of constituent parts described in the embodiments, the scope of the present invention is not restricted thereto unless otherwise specifically described.

Figure 1:
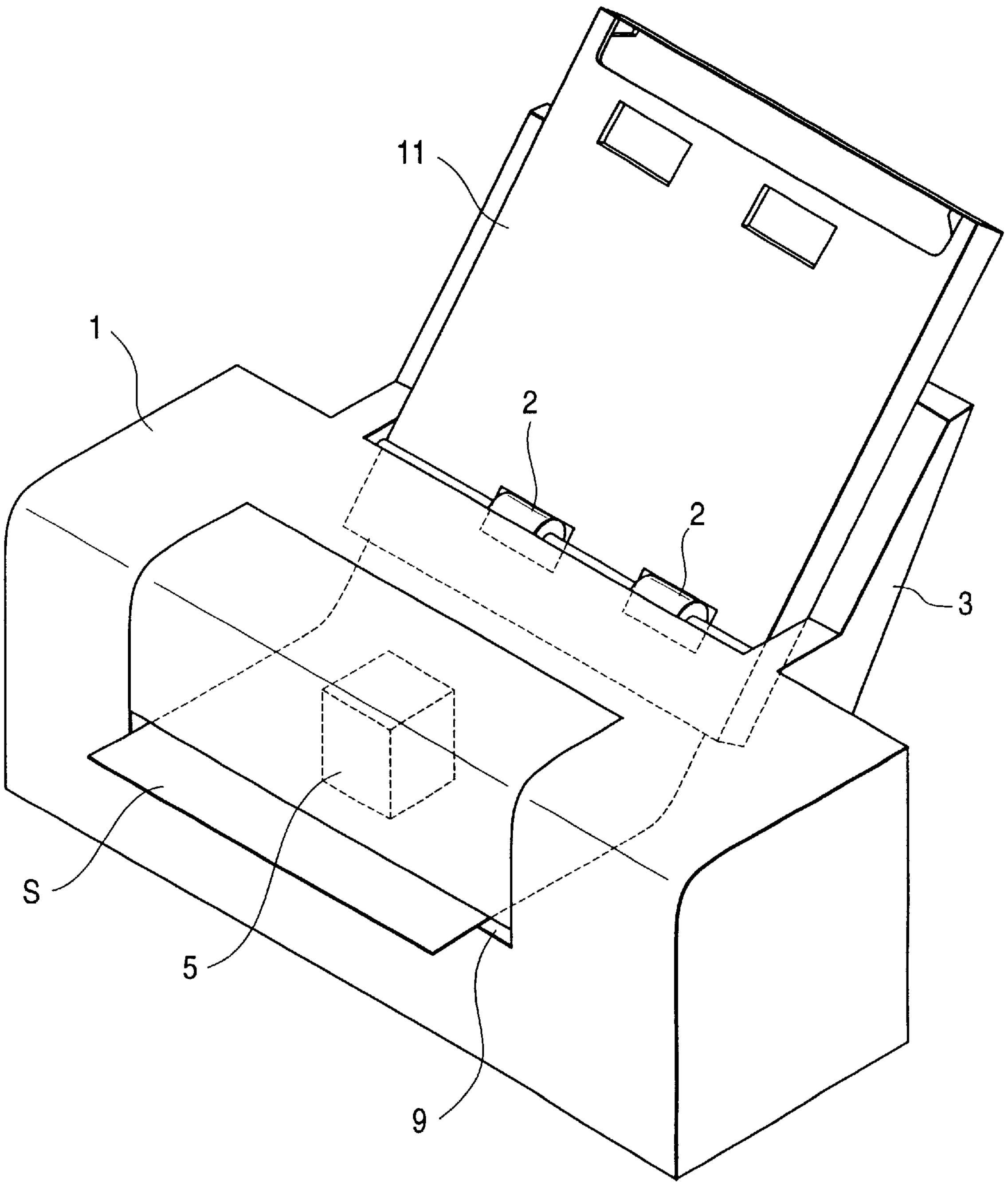
FIG. 1 is a perspective view showing a printer to which the present invention is applied.

A description will now be made of an example in which the sheet feeding apparatus of the present invention is used in a printer. FIG. 1 is a perspective view showing the sheet feeding apparatus.

The reference numeral 11 designates a sheet pack containing sheets S therein, the reference numeral 1 denotes a printer body as the sheet feeding apparatus, the reference numeral 2 designates a feed roller, the reference numeral 3 denotes a mounting portion as a sheet feeding portion for mounting the sheet pack 11, and the reference numeral 5 designates a printing head.

The design is made such that when the sheet pack 11 removably mountable on the mounting portion is mounted on the mounting portion 3, a sheet S in the sheet pack 11 is fed to an image forming portion, and is discharged from a discharge port 9.

The printing head 5 has a printing nozzle in the underside thereof and is designed to be capable of printing on the sheet S passing under the head 5.

Figure 2:
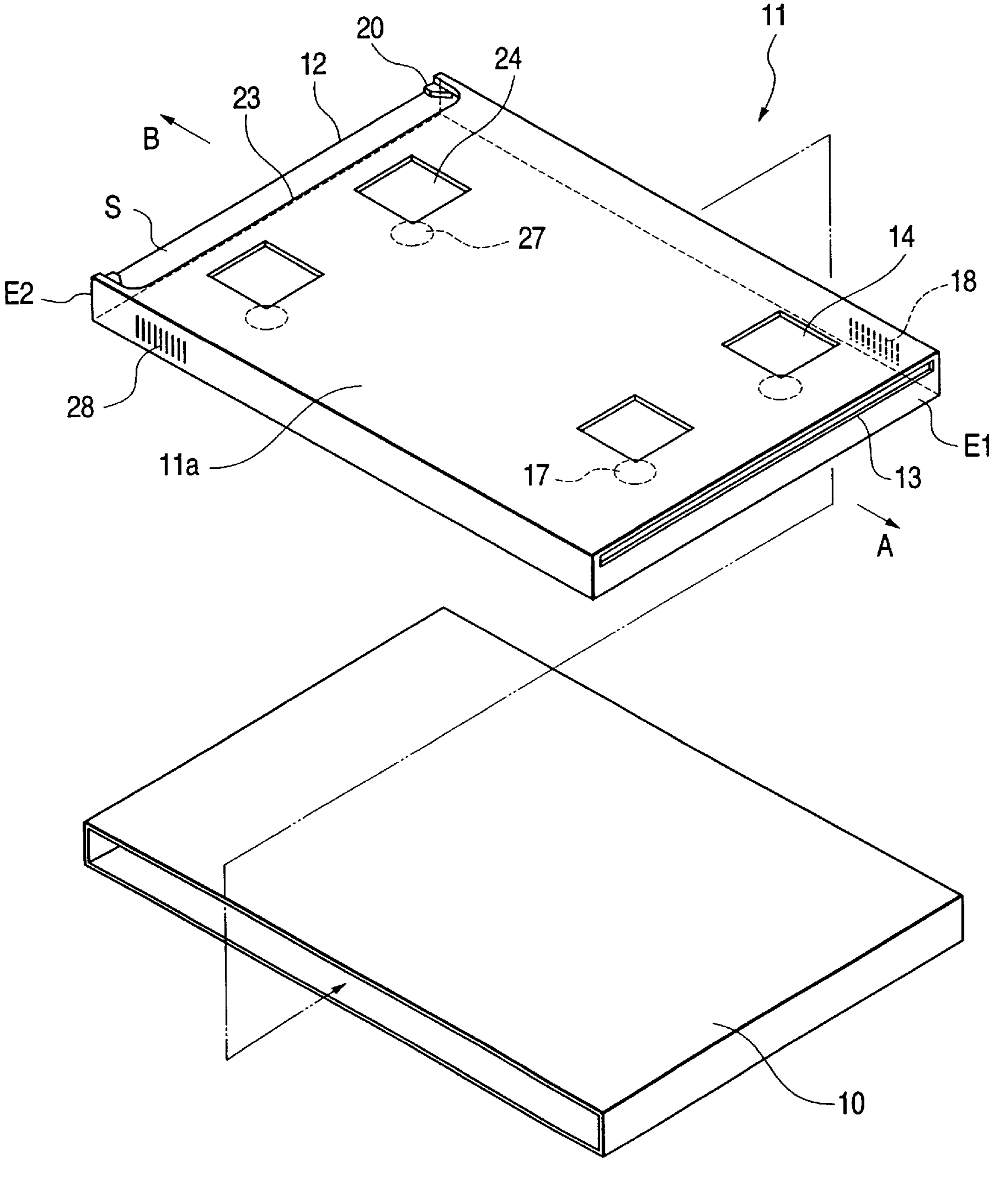
FIG. 2 is a perspective view showing an embodiment of the sheet pack of the present invention.
Figure 3A:
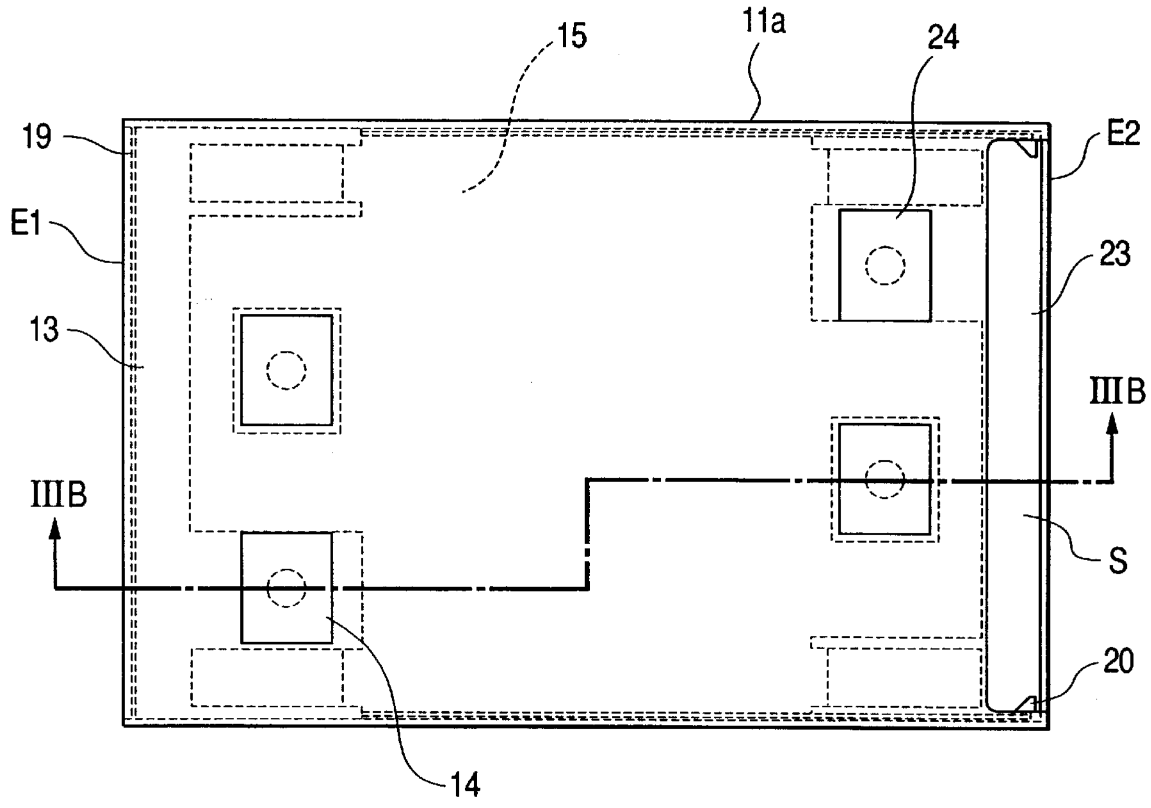
FIG. 3A is a plan view showing the sheet pack shown in FIG. 2.
Figure 3B:
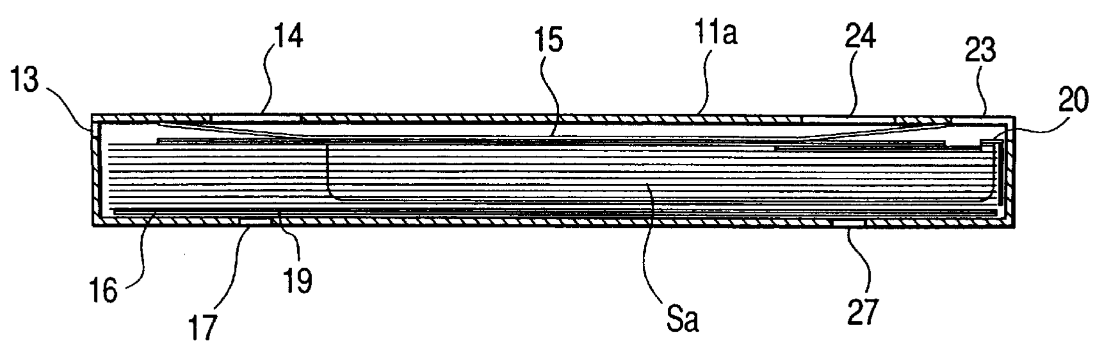
FIG. 3B is a cross-sectional view taken along the line IIIB—IIIB of FIG. 3A.

The construction of the sheet pack 11 will now be described. FIG. 2 is a perspective view showing the sheet pack 11, and FIGS. 3A and 3B are a plan view and a cross-sectional view, respectively, showing the sheet pack 11.

The letter S denotes sheets stacked in the sheet containing container 11*a* of the sheet pack 11, the reference numeral 13 designates a feeding port for feeding the sheets S from a predetermined end portion E1 to the printer body 1, the reference numeral 14 denotes bearing ports provided in the sheet pack 11 to enable the feed roller 2 of the printer body 1 to bear against the sheet S when the sheet pack 11 is mounted on the printer, the reference numeral 15 designates a leaf spring which is biasing means for retracting the sheets S from the feed roller 2 during nonfeeding, the reference numeral 16 denotes an urging plate for urging the sheet S against the feed roller 2 during feeding, and the reference numeral 17 designates urging ports provided in the sheet containing container 11*a* so that a lever from the printer body 1 can enter the sheet containing container 11*a* so as to make the sheet S bear against the feed roller 2.

The reference numeral 18 denotes an indication portion such as bar-codes indicative of information such as the kinds of the sheets S contained in the sheet pack 11, the contained state such as direction, and the setting of printing suitable for the sheets S.

The reference numeral 10 designates a case for closing the feeding port 13, the bearing ports 14 and the urging ports 17 to thereby protect the sheets from dust, outside light, temperature, humidity, etc. when the sheet pack 11 is removed from the printer body 1.

On the other hand, the reference numerals 23, 24, 27 and 28 denote a second feeding port, second bearing ports, second urging ports and a second indication portion, respectively, provided on the side opposite to the feeding port 13 to feed the aforementioned sheets S from the end portion E2 opposite to the predetermined end portion E1.

Of course, the case 10 closes the second feeding port 23, the second bearing ports 24 and the second urging ports 27 as well.

The second feeding port 23, the second bearing ports 24, the second urging ports 27 and the second indication portion 28 are disposed point-symmetrically with respect to the feeding port 13, the bearing ports 14, the urging ports 17 and the indication portion 18, respectively, and therefore the insertion of the sheet pack 11 into the mounting portion 3 can be done in any of the directions of arrows A and B.

The sheet containing container 11*a* has a leaf spring 15 on the sides of the feeding ports 13 and 23, and an urging plate 16 on the opposite side with a contained sheet bundle Sa therebetween.

When the sheet pack 11 is mounted on the printer but the feeding operation is not performed or when the sheet pack 11 has been removed from the printer body 1, the sheet bundle Sa is biased toward the urging plate 16 on the opposite side from the feeding ports 13, 23 by the biasing force of the leaf spring 15 and therefore, it never happens that the sheets S come out of the feeding ports 13, 23.

When during feeding, the urging plate 16 is pressed by an urging lever inserted through the urging ports 17 or the urging ports 27, the leading end of the sheet bundle Sa can be raised to the feeding port 13 or 23 of the sheet pack 11 against the biasing force of the leaf spring 15.

The end portions of the leaf spring 15 which are adjacent to the two feeding ports 13 and 23 are provided with sheet separating mechanisms using a pawl separating method and a frictional separating method differing from each other.

When the sheet is fed in the direction of arrow A from the feeding port 13 at the predetermined end portion E1, use is made of the frictional separating method in which a separating pad 19 is provided on the sheet side of the urging plate 16 so that frictional separation may be possible.

When the sheet is fed in the direction of arrow B from the feeding port 23 at the opposite end portion E2, use is made of the pawl separating method in which pawl portions 20 are provided on the end portion of the leaf spring 15 so that pawl separation may be possible.

Consequently, a separating method suitable even for the different mechanism of the printer body 1 can be selected to thereby mount the sheet pack 11.

Figure 4:
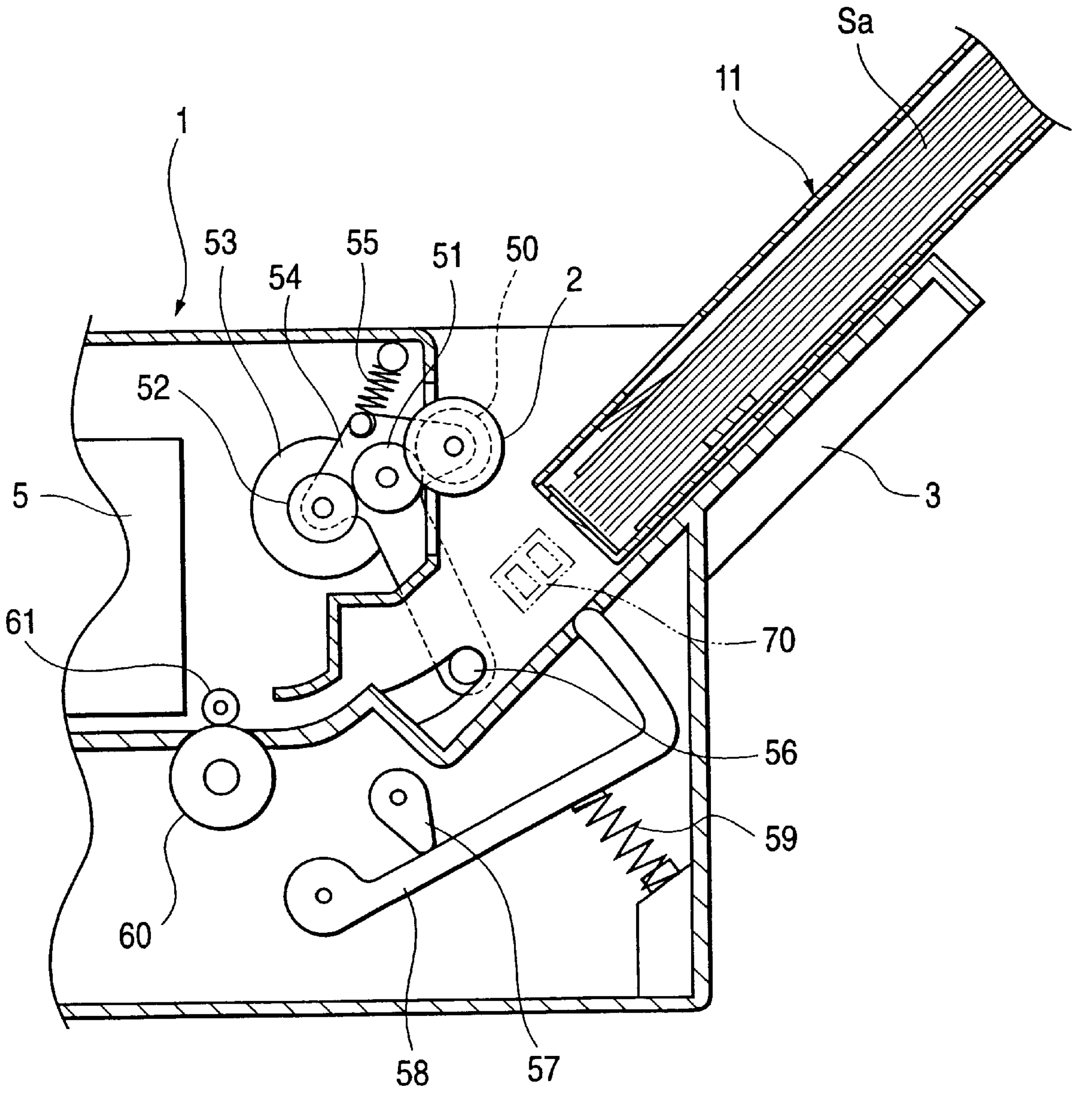
FIG. 4 is a cross-sectional view showing a sheet feeding apparatus in the state before the sheet pack shown in FIG. 2 is mounted.
Figure 5:
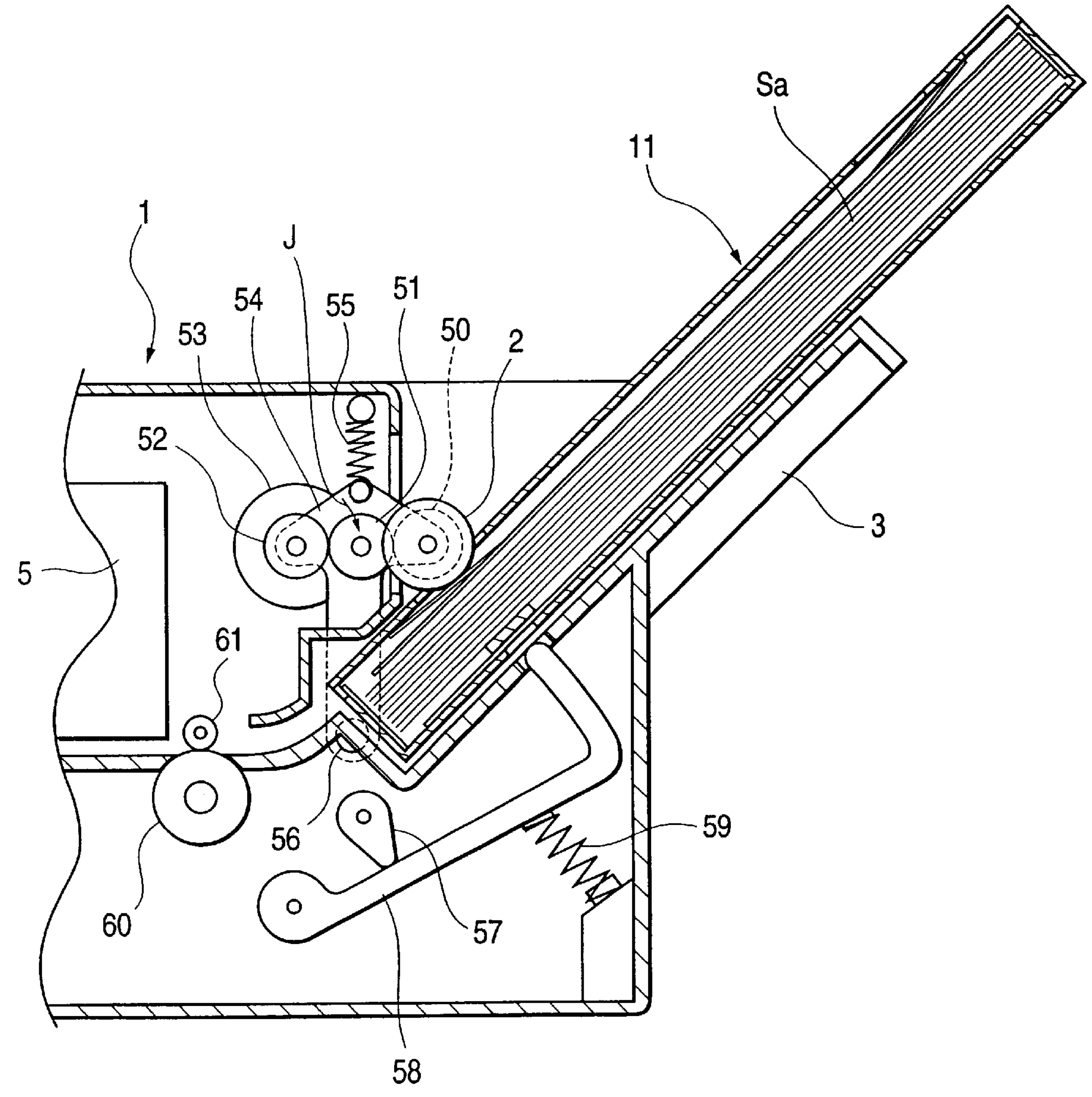
FIG. 5 is a cross-sectional view showing the sheet feeding apparatus in a state in which the sheet pack is mounted.
Figure 6:
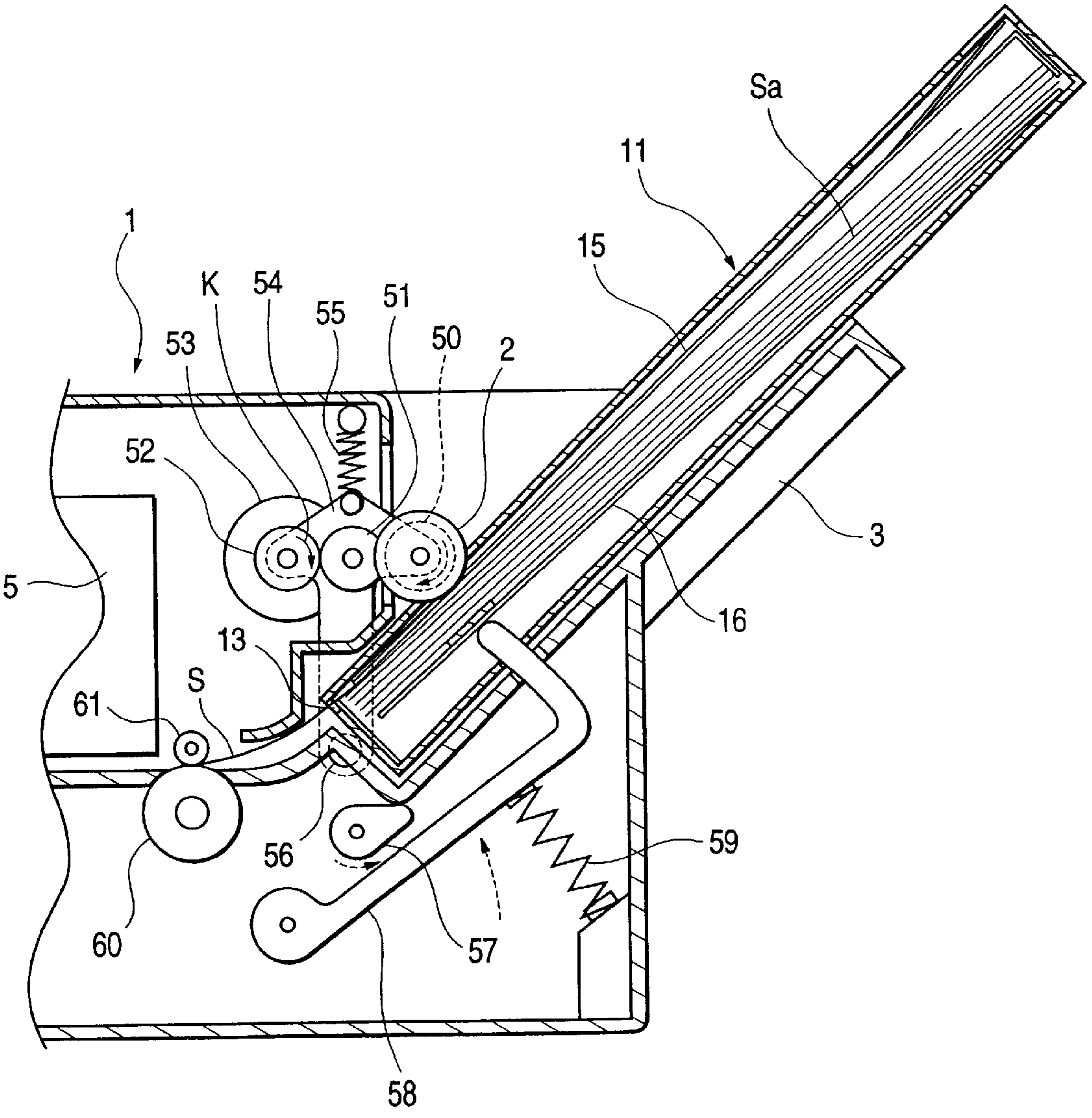
FIG. 6 is a cross-sectional view showing the sheet feeding apparatus in a state in which the sheet pack is mounted and a sheet is urged against a feed roller.

A description will now be made of the construction of the printer body 1 on which the sheet pack 11 is mounted. FIG. 4 or FIGS. 5 and 6 show a cross-sectional view along a sheet path when the sheet pack 11 is mounted on the printer body 1.

The reference numeral 54 designates a feed lever for rotating the feed roller 2 about a shaft of a motor 52 in response to the mounting or dismounting of the sheet pack 11, the reference numeral 55 denotes a spring for biasing the feed roller 2 toward its retracted side as shown in FIG. 4, and the reference numeral 52 designates the motor for driving the feed roller 2.

The rotation of the motor 52 is transmitted to the feed gear 50 of the feed roller 2 through a gear train 51 provided on the feed lever 54. The feed gear 50 and the feed roller 2 are rotated together.

The feed lever 54 is freely pivotally moved about the shaft of the motor 52, and is counter-clockwisely biased by a spring 55 when the sheet pack 11 is not mounted. At this time, the feed roller 2 is retracted so that the sheet pack 11 can be inserted, and a pin 56 is provided at the other end of the feed lever 54, and the pin 56 is located on the path of the mounting portion 3 along which the sheet pack 11 passes.

The reference numeral 60 designates a conveying roller for conveying the sheet S fed to the printer body 1, and the reference numeral 61 denotes a pinch roller for sandwiching the sheet S between it and the conveying roller 60.

The sheet S fed is sandwiched and is conveyed to an image forming portion facing the printing head 5. There, printing can be effected on the conveyed sheet S.

Further, the sheet S is conveyed to the discharge port 9, from which the sheet S is discharged.

The reference numeral 70 designates a sensor for reading indication portions 18 and 28 on the sides of the sheet containing container 11*a*. It is provided on the sheet reference side of the mounting portion 3 which is a position opposed to the indication portion 18 or the indication portion 28 of the inserted sheet pack 11, and reads the indication portions 18 and 28 of the sheet pack 11 when inserted. The design is made such that depending on the read information, the printer body 1 can effect print setting suitable for the sheet S in the inserted sheet pack 11.

The reference numeral 58 denotes an urging lever for pushing up the urging plane 16 of the sheet pack 11, the reference numeral 57 designates a cam for pivotally moving the urging lever 58, and the reference numeral 59 denotes a spring for biasing the urging lever 58 in an urging direction. The cam 57 is located so that before the mounting of the sheet pack 11, the urging lever 58 is retracted from the path of the mounting portion 3. The cam 57 is rotated by a drive motor, not shown. The design is made such that during feeding, the cam 57 is rotated to thereby move up and down the urging lever 58 by the biasing force of the spring 59.

The operation of the above-described construction will now be described. A description will first be made of the operation of mounting the sheet pack 11 on the mounting portion 3.

As previously described, FIG. 4 shows the state when the sheet pack 11 is inserted into the printer body 1. When the sheet pack 11 is inserted along the inclined surface of the mounting portion 3, the indication portion 18 (or 28) on a side of the sheet pack 11 passes across the sensor 70 provided on the reference side of the printer body 1.

At this time, the sensor 70 detects information including the kind, direction, front or back, direction of insertion, etc. of the inserted sheet. On the basis of this information, the printer body 1 effects the change in print setting to make the print setting suitable for the mounted sheet pack 11.

When the sheet pack 11 is further inserted, the end surface of the sheet pack 11 bears against the pin 56 of the feed lever 54. The feed lever 54 is rotatably mounted coaxially with the shaft of the motor 53, and is counter-clockwisely biased by the spring 55.

That is, the design is made such that before the insertion of the sheet pack 11, the feed roller 2 does not bear against the sheet pack 11.

When the sheet pack 11 is inserted, and is further inserted while bearing against the pin 56, the feed lever 54 is rotated clockwisely as indicated by arrow J in FIG. 5, and the feed roller 2 comes into the bearing port 14 (or 24) of the sheet pack 11. When the sheet pack 11 is inserted to the end wall, the feed roller 2 is moved to a predetermined position.

Thus, the insertion of the sheet pack 11 is completed. As described above, the insertion of the sheet pack 11 may be done in any of the directions of arrows A and B.

The sheet feeding operation will now be described.

When a printing command is inputted to the printer body 1, the feeding operation is started. The cam 57 is first rotated from a cam position shown in FIG. 5 to a cam position shown in FIG. 6 by a drive motor, not shown, and is stopped there.

Thereupon, the urging lever 58 restrained by the cam 57 is released from the restraint, and passes the urging ports 17 of the sheet pack 11 by the biasing force of the spring 59 and urges the urging plate 16.

The uppermost sheet S of the sheet bundle Sa stacked on the urging plate 16 overcomes the biasing force of the leaf spring 15 and is urged against the feed roller 2. The leading end of the uppermost sheet S is aligned with the position of the feeding port 13 of the sheet pack 11.

When the feed roller 2 is driven by the sheet feeding motor 53 and is rotated in the direction of arrow K in FIG. 6, the uppermost sheet S is separated from the sheet bundle Sa by the separating pawl 20 and is conveyed to the conveying roller 60. When it is detected by a sensor, not shown, for the sheet S to be sufficiently conveyed to a position in which it is a little flexed adjacently the nip between the conveying roller 60 and the pinch roller 61, the conveying roller 60 is rotated and is nipped by the nip.

At the same time, the rotation of the feed roller 2 is stopped and the cam 57 is again rotated to thereby retract the urging lever 58 from the sheet pack 11, whereupon the sheet feeding apparatus can be returned to the state of FIG. 5. In the state of FIG. 5, the interchange of the sheet pack 11 can be effected easily.

Since during feeding, the urging lever 58 is in the urging ports 17, the sheet pack 11 can be prevented from being pulled out during feeding.

With the mechanism as described above, in sheet packs 11 of different sheets, the urging force for feeding and the setting of the separating method are optimized in each sheet pack 11, and also in the same sheet pack 11, correspondingly to the difference in optimum setting from one kind to another of the printer, the urging force for feeding and the setting of the separating method can be selected by the insertion of sheets and therefore, feeding failure can be decreased.

On the other hand, as described above, the sheet pack of the present invention is of a simple construction and therefore, the material of the sheet pack may be a paper board, a cardboard, a PP sheet or the like, and the production of inexpensive sheet packs becomes possible. Thus, disposable sheet packs or reproducible sheet packs can be inexpensively provided to users.

While the above embodiment has been described with respect to an apparatus for effecting image formation by printing using the printing head 5, the present invention is not restricted thereto.

Figure 7:
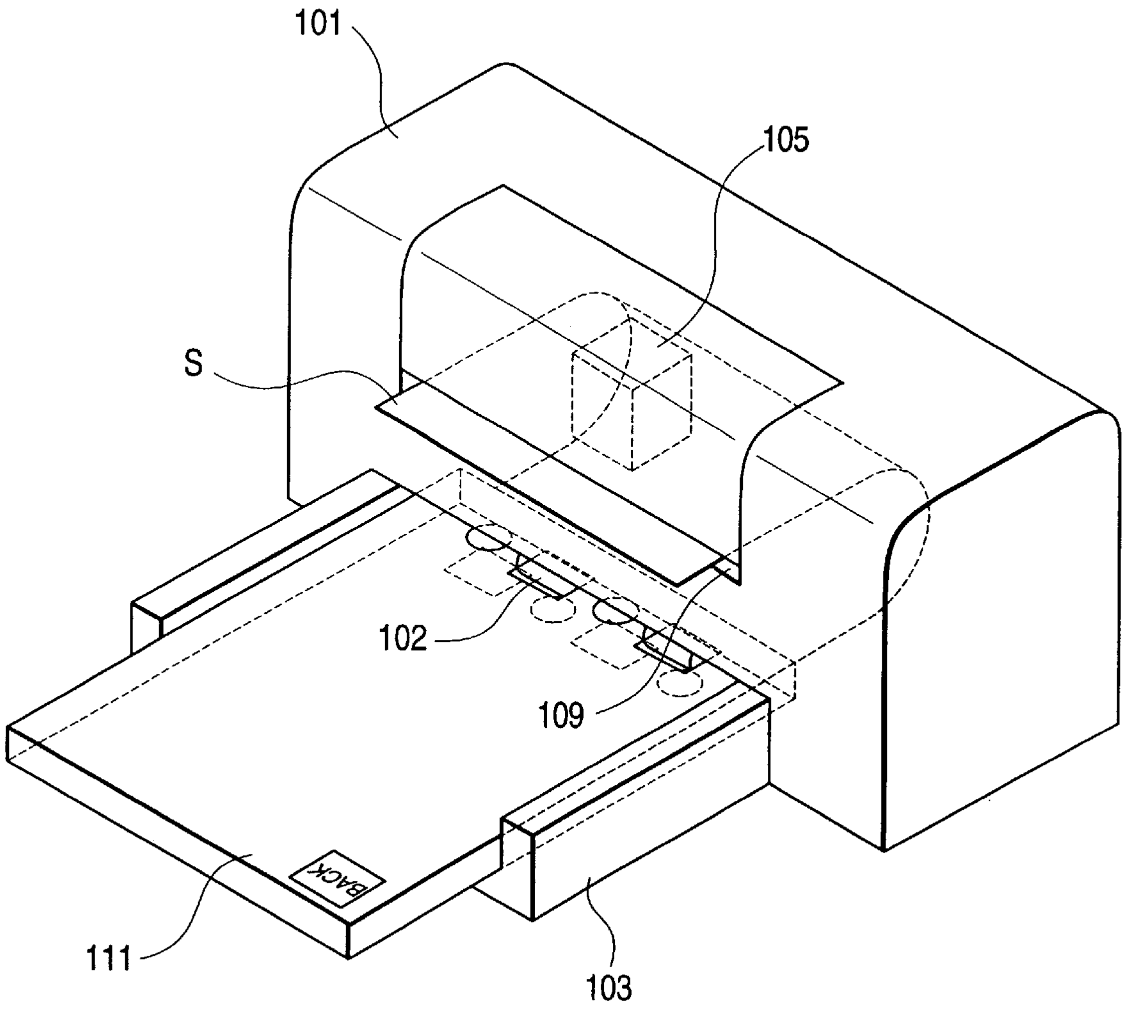
FIG. 7 is a perspective view showing another embodiment of the printer to which the present invention is applied.

FIG. 7 is a perspective view showing a sheet feeding apparatus according to another embodiment. The reference numeral 111 designates a sheet pack containing sheets S therein, the reference numeral 101 denotes a printer body, the reference numeral 102 designates a feed roller, the reference numeral 103 denotes a mounting portion for mounting the sheet pack 111, and the reference numeral 105 designates a printing head.

The design is made such that when the sheet pack 111 removably mountable on the mounting portion 103 is mounted on the mounting portion 103, a sheet S in the sheet pack 111 is fed and is U-turned by a conveying roller, not shown, and is sent to an image forming portion for forming an image, and is discharged from a discharge port 109.

The printing head 105 has a printing nozzle in the underside thereof, and is designed to be capable of printing on sheets passing under the printing head 105.

Thus, in this case, the sheet S is being fed with its surface (hereinafter referred to as the back surface) opposite to the print surface (hereinafter referred to as the front surface) bearing against the feed roller 102.

Figure 8:
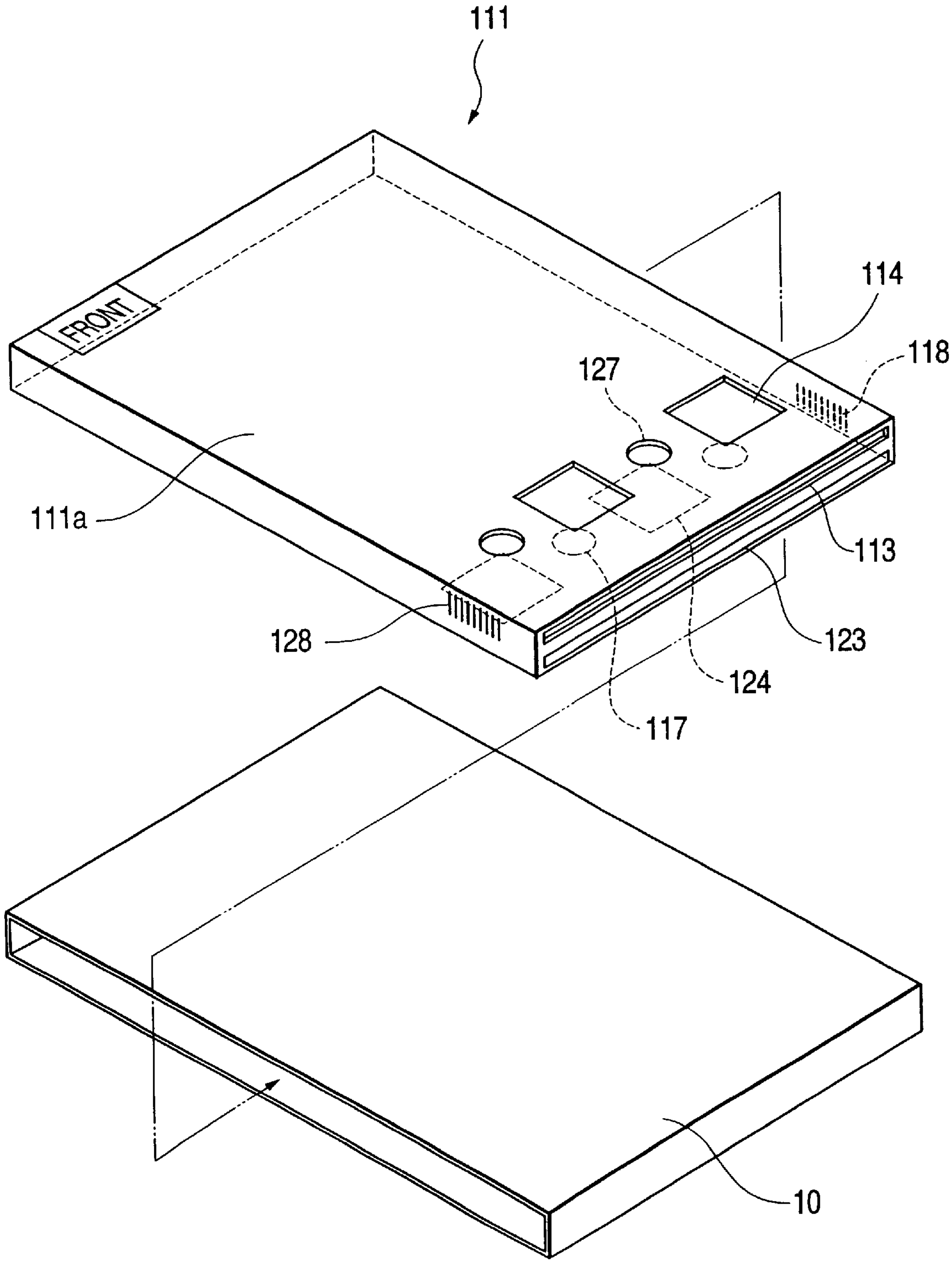
FIG. 8 is a perspective view showing another embodiment of the sheet pack of the present invention.
Figure 9A:
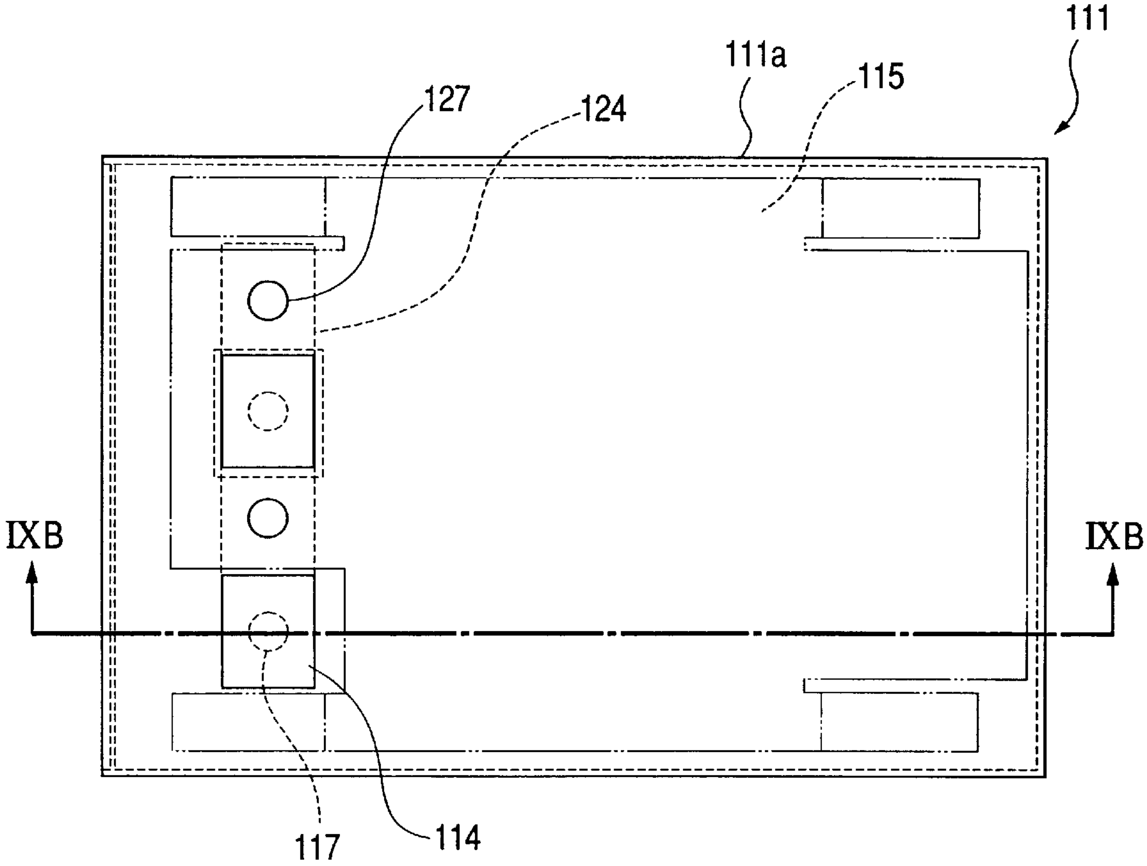
FIG. 9A is a plan view showing the sheet pack shown in FIG. 8.
Figure 9B:
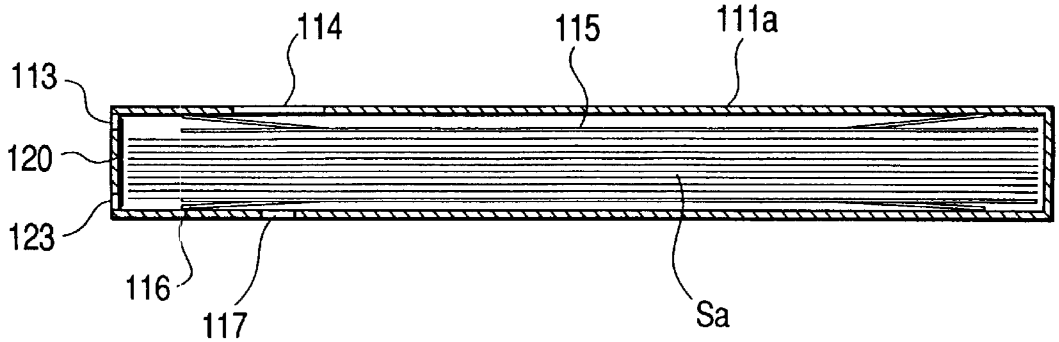
FIG. 9B is a cross-sectional view taken along the line IXB—IXB of FIG. 9A.

Description will now be made of the construction of the sheet pack 111 suitable for this printer construction. FIG. 8 shows a perspective view of the sheet pack 111, and FIGS. 9A and 9B show a plan view and a cross-sectional view, respectively, of the sheet pack 111.

The reference character 111*a* designates a sheet containing container, the reference numerals 113 and 123 denote feeding ports for feeding sheets to the printer body 101, and the reference numerals 114 and 124 designate bearing ports provided in the sheet containing container 111*a* to enable the feed roller 102 of the printer body 101 to bear against the sheet S when the sheet pack 111 is mounted on the printer body 101.

The reference numerals 115 and 116 denote leaf springs which are biasing means for retracting the sheet S from the feed roller 102 during nonfeeding, and these leaf springs 115 and 116 serve also as urging plates for urging the sheet against the feed roller 102 during feeding.

The reference numerals 117 and 127 designate urging ports provided in the sheet containing container 111*a* so that the lever of the printer body 101 can enter the sheet containing container 111*a* so that the sheet S may bear against the feed roller 102.

The reference numerals 118 and 128 denote indication portions such as bar-codes indicative of information including the kind and contained state such as direction of the sheets contained in the sheet pack 111, or the setting of print suited for the sheets.

The feeding port 123, the bearing ports 124, the urging ports 127 and the indication portion 128 are disposed vertically symmetrically with respect to the feeding port 113, the bearing ports 114, the urging ports 117 and the indication portion 118, respectively, and therefore the insertion of the sheet pack 111 into the mounting portion 103 may be done with the sheet pack 111 reversed.

The sheet containing container 111*a* has leaf springs 115 and 116 on the side of the feeding port 113 and the side of the feeding port 123, respectively, with a contained sheet bundle Sa therebetween.

When the sheet pack 111 is mounted on the printer body 101 but the feeding operation is not performed or when the sheet pack 111 has been removed from the printer, the sheet bundle Sa is biased away from the feeding ports 113 and 123 by the biasing forces of the leaf springs 115 and 116 and therefore, it never happens that the sheet S comes out of the feeding ports 113 and 123 by gravity.

When during feeding, one of the leaf springs 115 and 116 is pressed by an urging lever coming in through the urging port 117 or 127, the leading end of the sheet bundle Sa can be raised to the feeding port 113 or 123 of the sheet pack 111 against the biasing force of the other of the leaf springs 115 and 116.

As described above, the two feeding ports 113 and 123 are provided in the upper and lower portions corresponding to those of the same end of the sheet bundle Sa and therefore, both of a case where the sheet S is fed from the front surface and a case where the sheet S is fed from the back surface can be coped with.

In the case of the printer as shown in FIG. 1, the sheet pack 111 can be mounted so that the sheet may be fed with its front surface facing upwardly, and in the case of the printer as shown in FIG. 7, the sheet pack 111 can be mounted so that the sheet may be fed with its back surface facing upwardly.

That is, a suitable feeding method can be selected even for the mechanisms of different printers so that the same sheet pack 111 can be mounted.

According to the above-described construction, when the sheet S is to be fed, a sheet pack 111 common to the kinds of machines differing in the feeding method from one another can be provided and therefore, the cost can be reduced. Further, even for a user having a plurality of kinds of machines, it is unnecessary to prepare a sheet pack 111 exclusively for use with each kind of machine and custody becomes easy.

Figure 10:
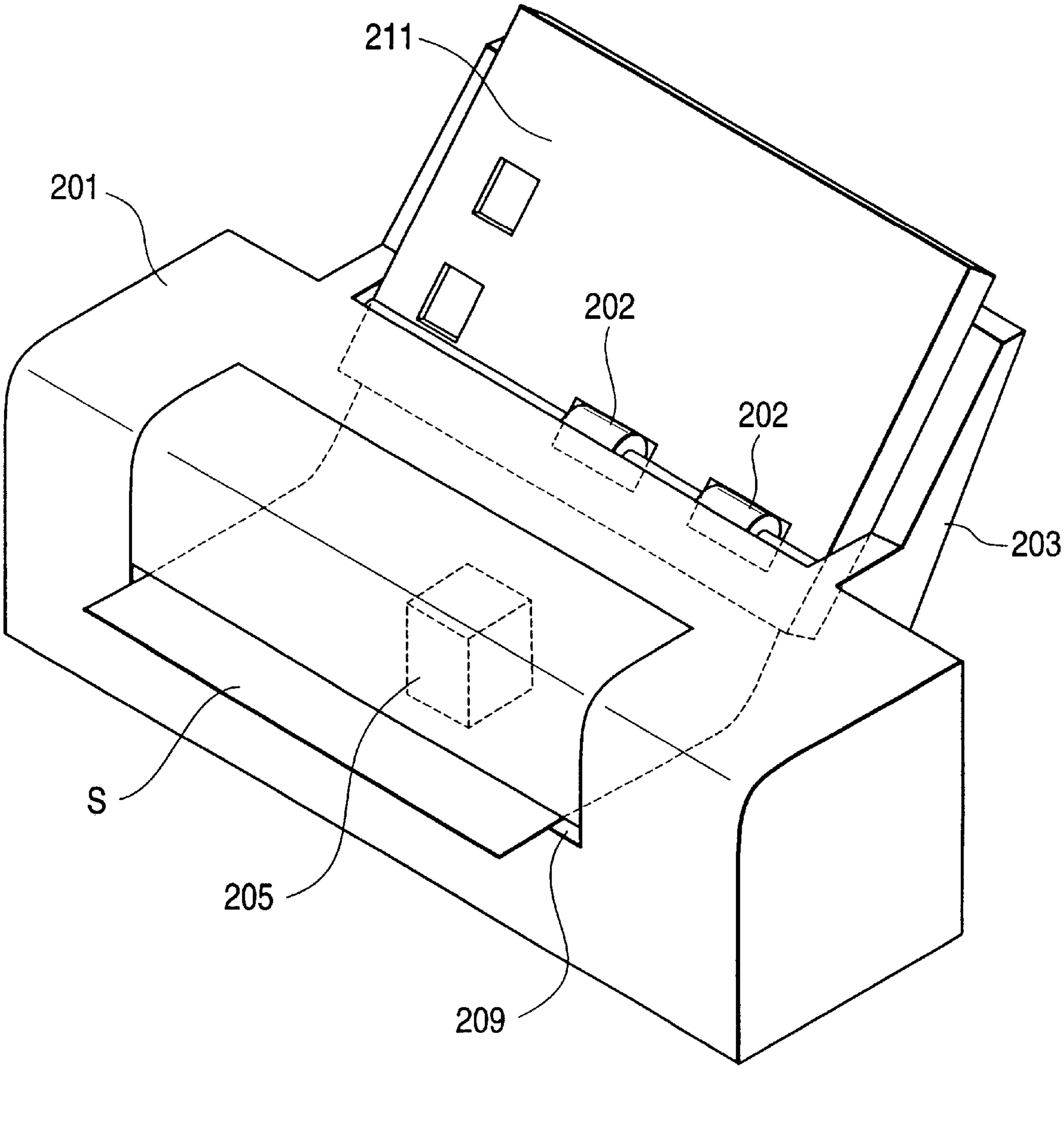
FIG. 10 is a perspective view of another embodiment of the printer to which the present invention is applied.

A description will now be made of a sheet feeding apparatus according to still another embodiment. FIG. 10 is a perspective view showing an image forming apparatus.

The reference numeral 211 designates a sheet pack containing sheets S therein, the reference character 211*a* denotes a sheet containing container, the reference numeral 201 designates a printer body, the reference numeral 202 denotes a feed roller, the reference numeral 203 designates a mounting portion for mounting the sheet pack 211, and the reference numeral 205 denotes a printing head.

The sheet pack 211 is removably mountable on the mounting portion 203. When the sheet pack 211 is mounted on the mounting portion 203, a sheet S in the sheet pack 211 may be fed to a printing portion, and be discharged from a discharge port 209.

The printing head 205 has a printing nozzle in the underside thereof, and is designed to be capable of printing on the sheet S passing under the head 205.

In the case of this printer, the width of the sheets S which can be fed is great so that the sheets S can be longitudinally or laterally fed.

Figure 11:
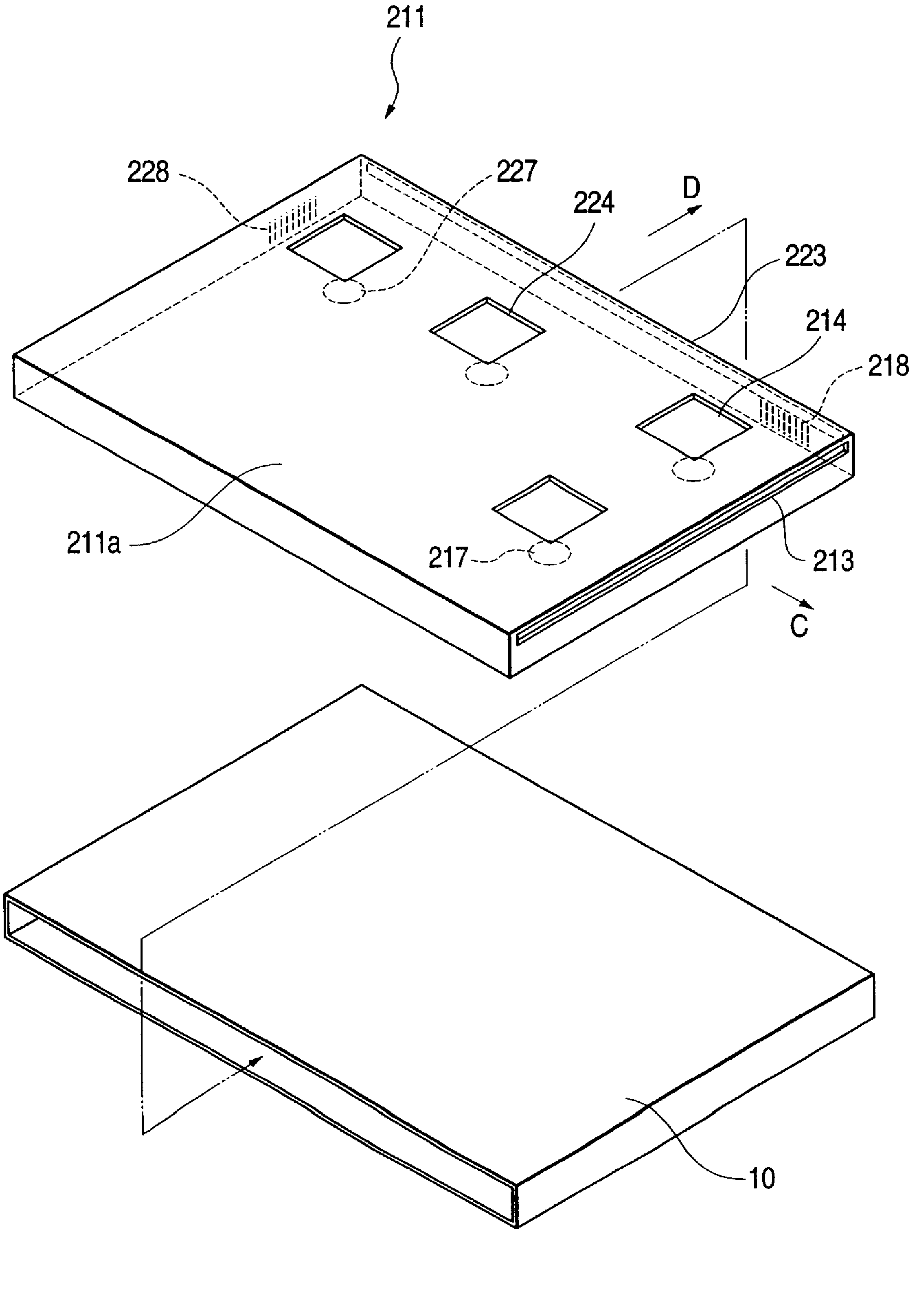
FIG. 11 is a perspective view showing another embodiment of the sheet pack of the present invention.
Figure 12A:
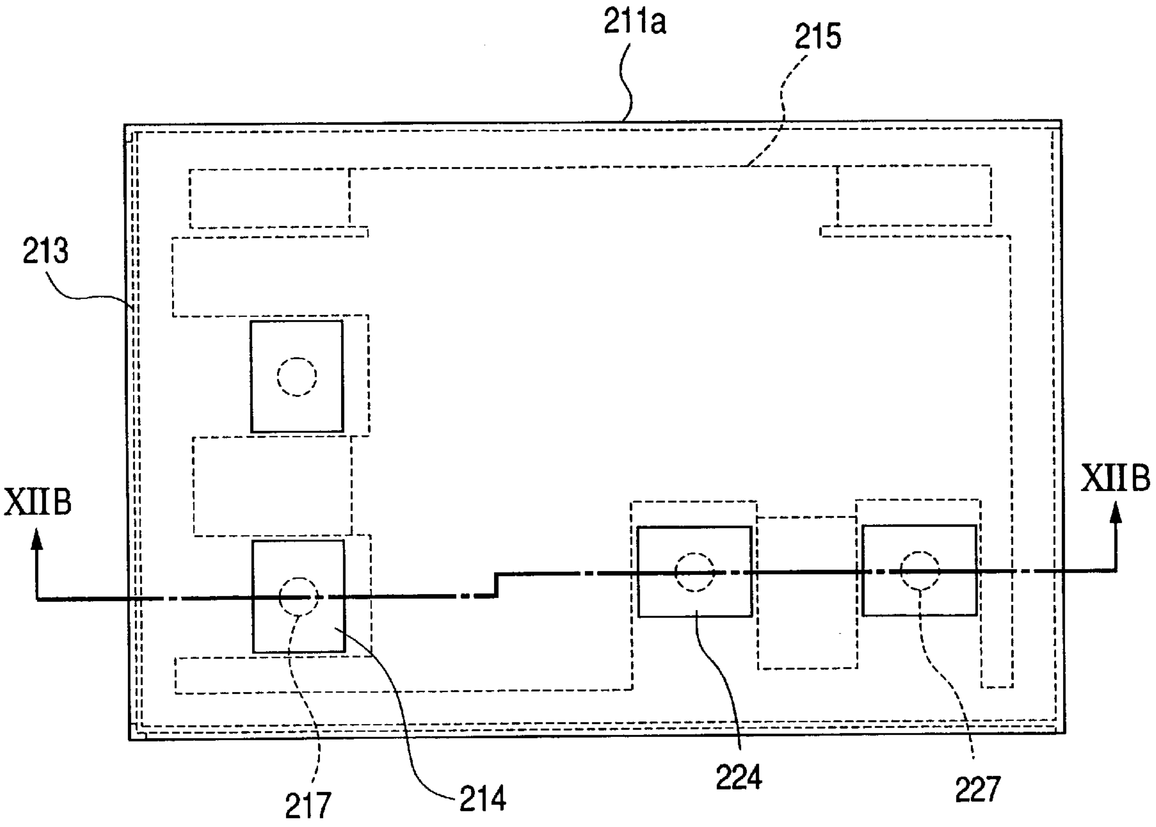
FIG. 12A is a plan view showing the sheet pack shown in FIG. 11.
Figure 12B:
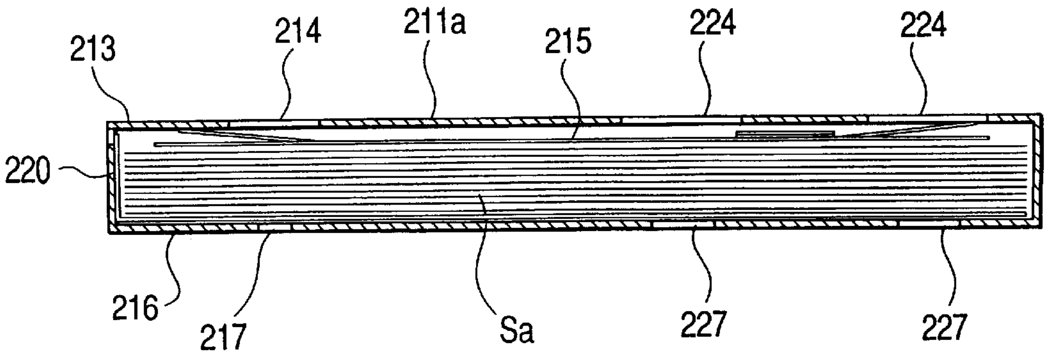
FIG. 12B is a cross-sectional view taken along the line XIIB—XIIB of FIG. 12A.

A description will now be made of the construction of the sheet pack 211 suited for this printer construction. FIG. 11 shows a perspective view of the sheet pack 211, and FIGS. 12A and 12B show a plan view and a cross-sectional view, respectively, of the sheet pack 211.

The reference numeral 213 designates a feeding port for feeding the sheet S to the printer body 201 with the longitudinal direction of the sheet S as the conveyance width, the reference numeral 214 denotes a bearing port provided in the sheet containing container 211*a* to enable the feed roller 202 of the printer body 201 to bear against the sheet S when the sheet pack 211 is mounted on the printer body 201, the reference numeral 215 designates a leaf spring which is biasing means for retracting the sheet S from the feed roller 202 during nonfeeding, the reference numeral 216 denotes an urging plate for urging the sheet S against the feed roller 202 during feeding, and the reference numeral 217 designates urging ports provided so that the lever of the printer body 201 can enter the sheet containing container 211*a* so as to make the sheet S bear against the feed roller 202.

The reference numeral 218 denotes bar-codes as an indication portion indicative of information including the kind and contained state such as direction of the sheets contained in the sheet pack 211 or the setting of print suitable for the sheets.

On the other hand, the reference numerals 223, 224, 227 and 228 designate a second feeding port, a second bearing ports, second urging ports and second bar-codes, respectively, for laterally feeding the sheet, and these are disposed at positions of 90° rotation with respect to the feeding port 213, the bearing ports 214, the urging ports 217 and the bar-codes 218, respectively, and the insertion of the sheet pack into the mounting portion 203 of the apparatus is possible in any of the directions of arrows C and D.

The sheet containing container 211*a* has a leaf spring 215 on the feeding port 213 side and an urging plate 216 on the opposite side with a sheet bundle Sa contained in the sheet pack 211 therebetween.

When the sheet pack 211 is mounted on the printer body 201 but the feeding operation is not performed or when the sheet pack 211 has been removed from the printer body 201, the sheet bundle Sa is biased toward the opposite side from the feeding port 213 or 223 by the biasing force of the leaf spring 215 and therefore, it never happens that the sheet comes out of the feeding port 213 (or 223).

When during feeding, the urging plate 216 is pressed by an urging lever coming in through the urging ports 217 or 227, the leading end of the sheet bundle Sa can be raised to the feeding port 213 or 223 of the sheet pack 211 against the biasing force of the leaf spring 215.

A detailed description will hereinafter be made of means for causing the printer to recognize the quality, the remaining amount, etc. of the sheets contained in the sheet pack.

Figure 13:
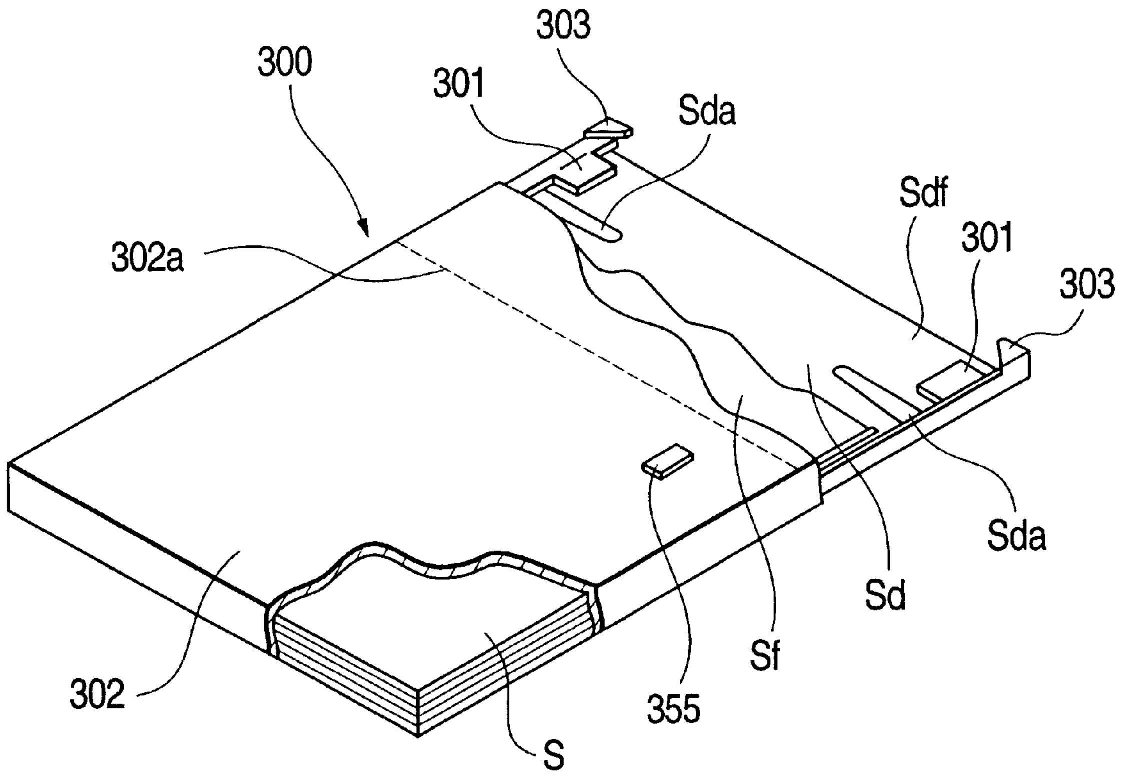
FIG. 13 is a partially broken-away perspective view of another embodiment of the sheet pack of the present invention.

In FIG. 13, the reference numeral 300 designates a sheet pack, the letter S denotes sheets on which images are to be recorded, and the reference character Sd designates the lowermost sheet. A portion of the lowermost sheet Sd is adhesively secured to a sheet containing container 302. The holding portions 301 of separating pawls 303 which are separating means to be described are joined to the leading end portion Sdf of the lowermost sheet Sd.

The sheet containing container 302 is formed into a bag-like shape by flexible film (thin sheet) such as vinyl and hermetically contains the sheets S therein. The sheet containing container 302 is formed with a perforated line 302*a* for exposing the leading ends of the sheets by cutting off a portion of the sheet containing container 302. A pair of separating pawls 303 are provided on a side portion of the sheet containing container 302. The separating pawls 303 bear against the corners of the leading end of the sheets S. Holding portions 301 are formed on the lower end portions of the separating pawls 303. The holding portions 301 are joined to the end portion of the lowermost sheet Sd. The opposite sides of the leading end portion of the lowermost sheet Sd are formed with slits Sda orthogonal to the direction of feeding of the sheets to increase the degree of freedom with which they are pushed up by an urging plate 315 which will be described later.

Figure 14:
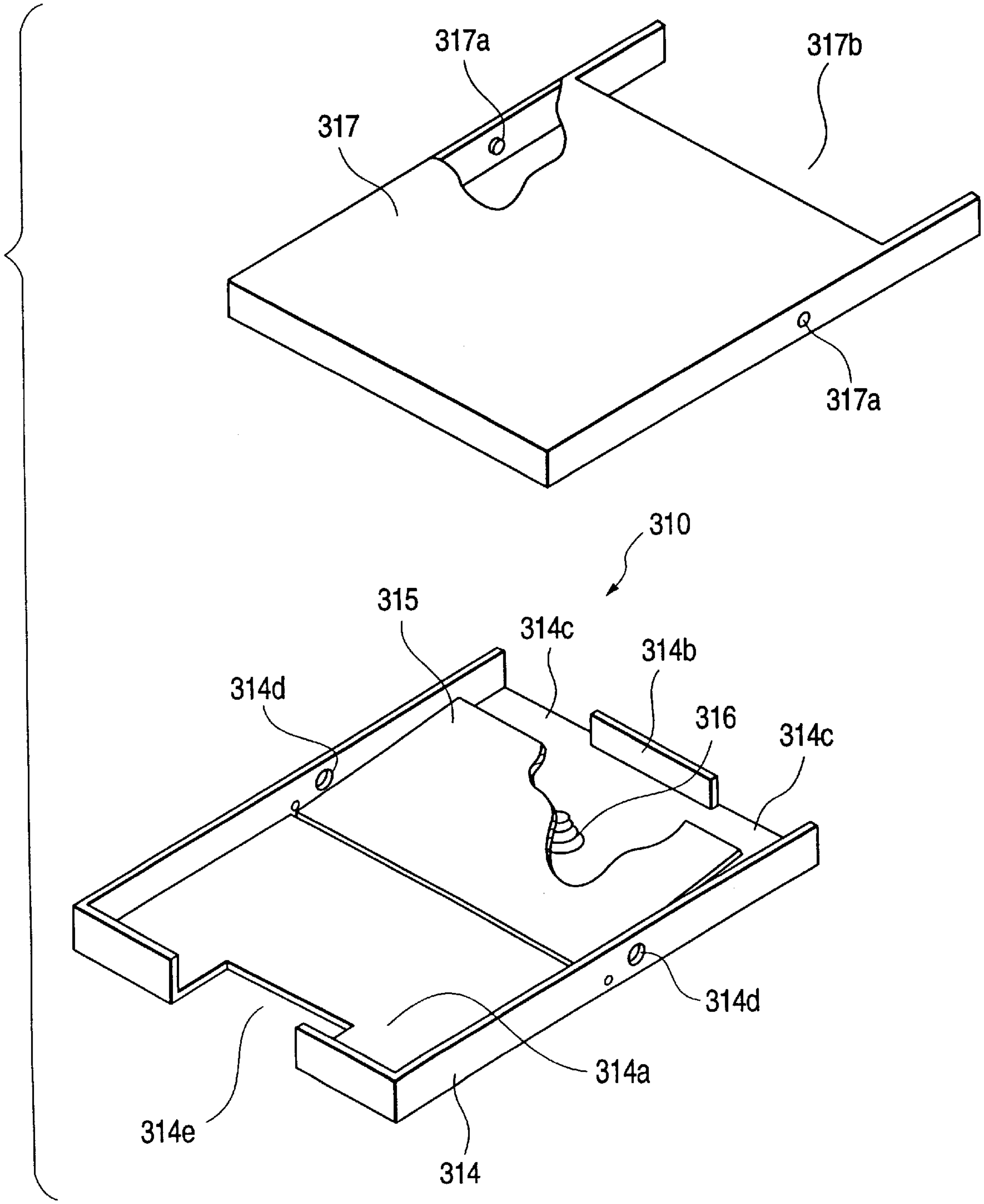
FIG. 14 is an exploded perspective view of a cassette containing the sheet pack.

In FIG. 14, a cassette 310 is comprised of a cassette body 314 for automatic sheet feeding, and a cassette lid 317. The cassette 310 is formed with a tub portion 314*a* in which the sheet containing container 302 is contained, and is removably mountable on the cassette mounting portion of a printer (recording apparatus) which will be described later.

A sheet stopper 314*b* is formed on the center of the fore end portion of the cassette body 314. The upper portion of the sheet stopper 314*b* is set at a position whereat it does not strike against the sheet fed during sheet feeding. Pawl relieved portions 314*c* for receiving the separating pawls 303 therein are formed on the opposite sides of the sheet stopper 314*b*.

Click holes 314*d* for the clicking of the cassette lid 317 are formed in the opposite sides of the cassette body 314. A cut-away portion 314*e* is formed at the center of the rear end portion of the cassette body 314. This cut-away portion 314*e* is formed to easily grasp the sheet containing container 302 when the sheet containing container 302 is to be taken out. The cassette body 314 is provided with a pressure plate 315. The pressure plate 315 is pivotally supported at a predetermined position on the bottom surface portion of the cassette body 314. A pressure plate spring 316 is disposed between the cassette body 314 and the pressure plate 315. The pressure plate 315 is adapted to urge the sheet S against the sheet supply roller 352 (see FIG. 15) of a printer 351 which will be described later by the pressure plate spring 316 when the cassette 310 is mounted on the printer.

The cassette lid 317 overlaps the upper portion of the cassette body 314 and covers the rear end portion of the cassette body 314 to thereby make the sheet pack 300 and the cassette body 314 easy to handle. A pair of inwardly protruded fixed projections 317*a* are formed on the right and left of the intermediate portion of the cassette lid 317. The fixed projections 317*a* are projectedly provided to fix and position the cassette lid 317 to the cassette body 314 with a moderate engaging force. The fore end portion of the cassette lid 317 is formed with an opening portion 317*b* for receiving a sheet feeding roller 352 which will be described later.

Figure 15:
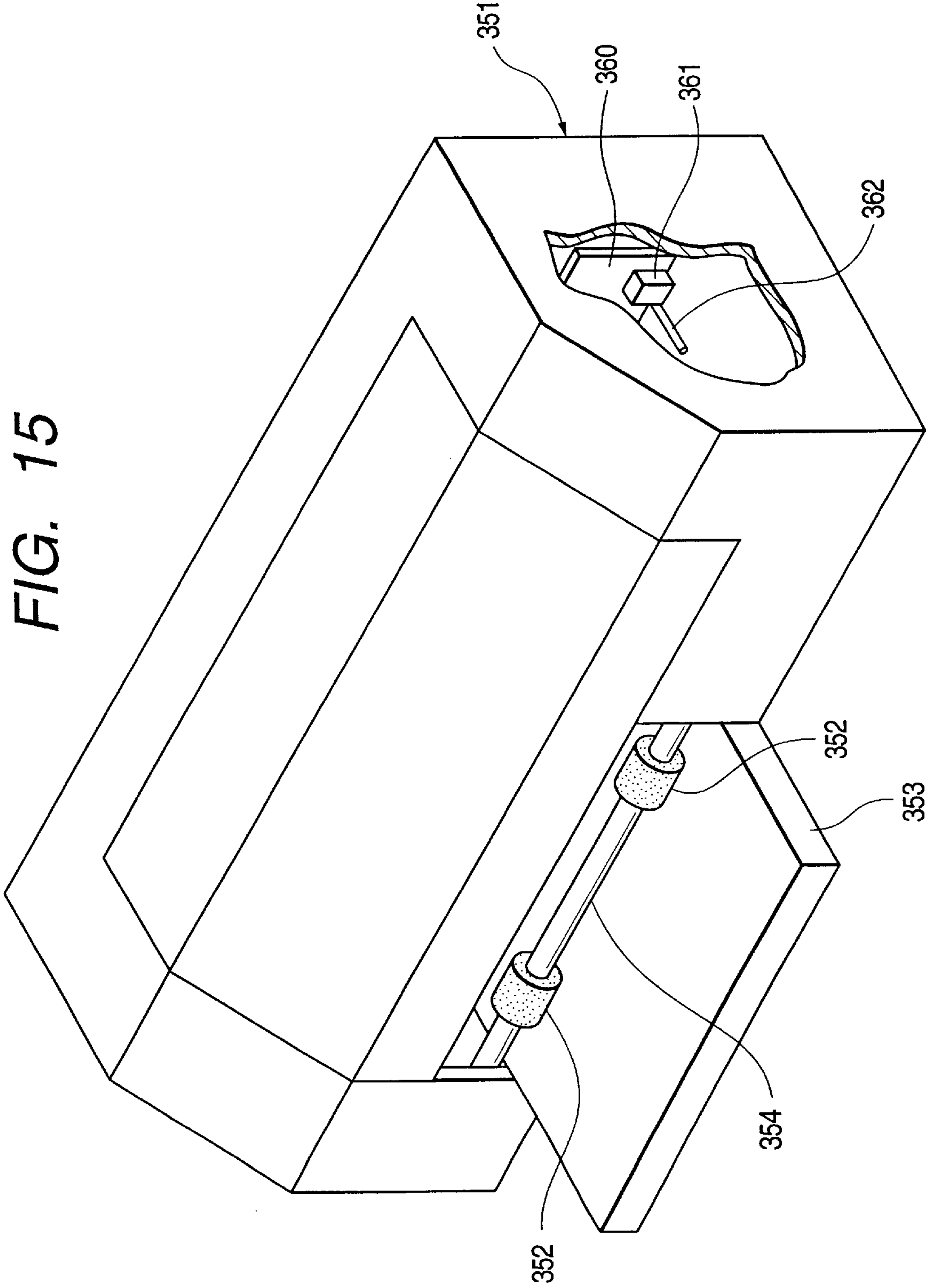
FIG. 15 is a perspective view of a printer on which the sheet pack contained in the cassette is mounted.

Referring now to FIG. 15, a printer 351 on which the cassette 310 is removably mounted is provided with a head for recording information on the sheets S, a sheet feeding mechanism, a data processing portion, a power source portion, etc., and a cassette receiver 353 for mounting the cassette 310 is installed on the lower portion of the front surface thereof.

Above the cassette receiver 353, a pair of right and left sheet supply rollers 352 are secured to and disposed on a rotatable sheet feeding shaft 354. The sheet feeding shaft 354 is connected to a drive device, not shown. These constitute sheet feeding means.

Further, on the upper surface of the sheet containing container 302 of FIG. 13, a recording label 355 for electric wave communication integrally formed with a microprocessor and an antenna actuated by electromagnetic induction is stuck as means for exchanging the information of the sheets with the printer 351. The recording label 355 contains therein a procedure for communication and software for record writing, and has a writing memory element of a predetermined capacity. Also, in the interior of the printer 351 of FIG. 15, there are equipped a substrate 360 for communication, an element 361 for communication and an antenna 362 at predetermined positions.

The operation will now be described.

When the fore end portion of the sheet containing container 302 is first cut off along the perforated line 302*a* of the sheet containing container 302, the leading end portion Sf of the sheet S and the separating pawls 303 become exposed.

In this state, the leading end portion Sf of the sheet S is held down by the separating pawls 303 and therefore, it never happens that the sheet S falls off from the sheet containing container 302. Next, in this state, the sheet pack 300 is put into the tub portion 314*a* of the cassette body 314. At this time, the leading end portion Sf of the sheet S bears against the sheet stopper 314*b*, and the separating pawls 303 located on the pawl relieved portions 314*c* provided at the right and left do not bear against the cassette 310. Next, the cassette body 314 replenished with sheets is mounted on the cassette receiver 353 of the printer 351 after the cassette lid 317 has been mounted.

In the cassette 310 mounted on the printer 351, the uppermost sheet S bears against the sheet supply roller 352, and with the rotation of the sheet supply roller 352, the sheets S are successively fed into the printer 351.

At that time, the separating pawls 303 bear against the upper surface of the sheet S pushed up by the pressure plate 315. The separating pawls 303 may be made of plastic and may utilize the resilient force of the plastic to add a bearing force. The lowermost sheet Sd is stuck on the sheet containing container 302 and therefore is not feed, but serves as a friction pad for preventing several sheets stacked on the lowermost sheet Sd from being fed out in a lamp.

In this case, the last sheet may be colored so that the exhaustion of the sheets can be discriminated.

Accordingly, to replenish the printer 351 with sheets S, the sheet pack 300 containing the sheets S therein is put into the cassette 310 so that the printer 351 may be replenished with the cassette 310 and therefore, without fingers of an operator touching the sheets, the printer 351 is replenished with the sheets S.

Also, the separating pawls 303 of a shape suited for the sheets S contained in the sheet containing container 302 are contained in advance in the sheet containing container 302 in a state in which they can contact with the upper surface of the leading end of the sheets S and therefore, when the cassette 310 is to be mounted on the printer 351, it is not necessary to pass the sheets S under the separating pawls 303. From this, it will be seen that the fingers of an operator do not touch the sheets.

An openable tape of a narrow width may be used instead of the perforated line 302*a*.

Figure 21:
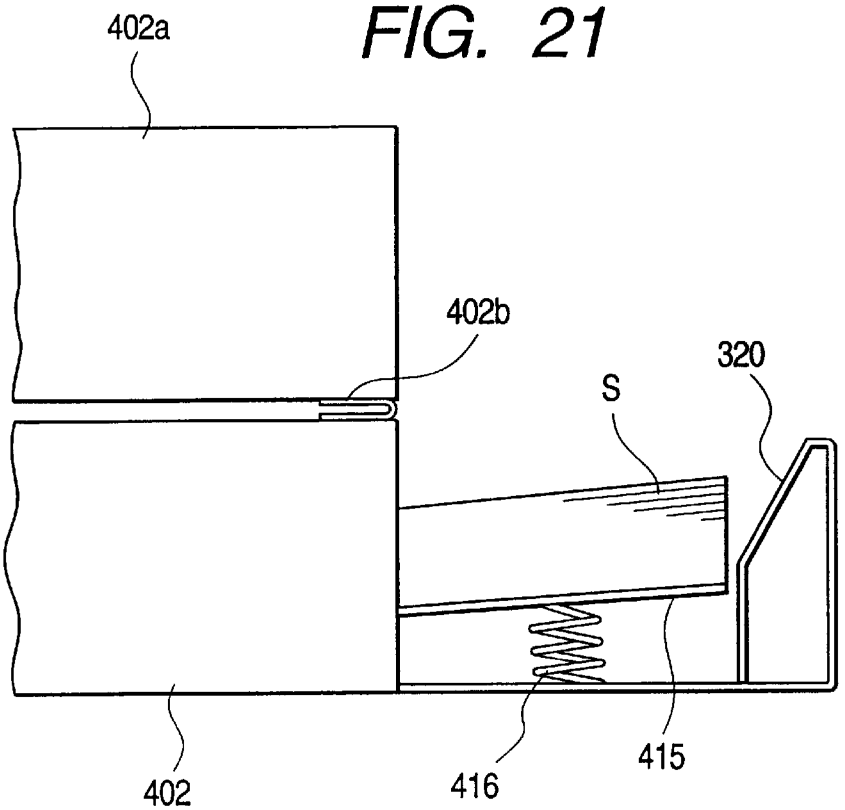
FIG. 21 is a side view showing another example of separating means provided in the sheet pack.
Figure 22:
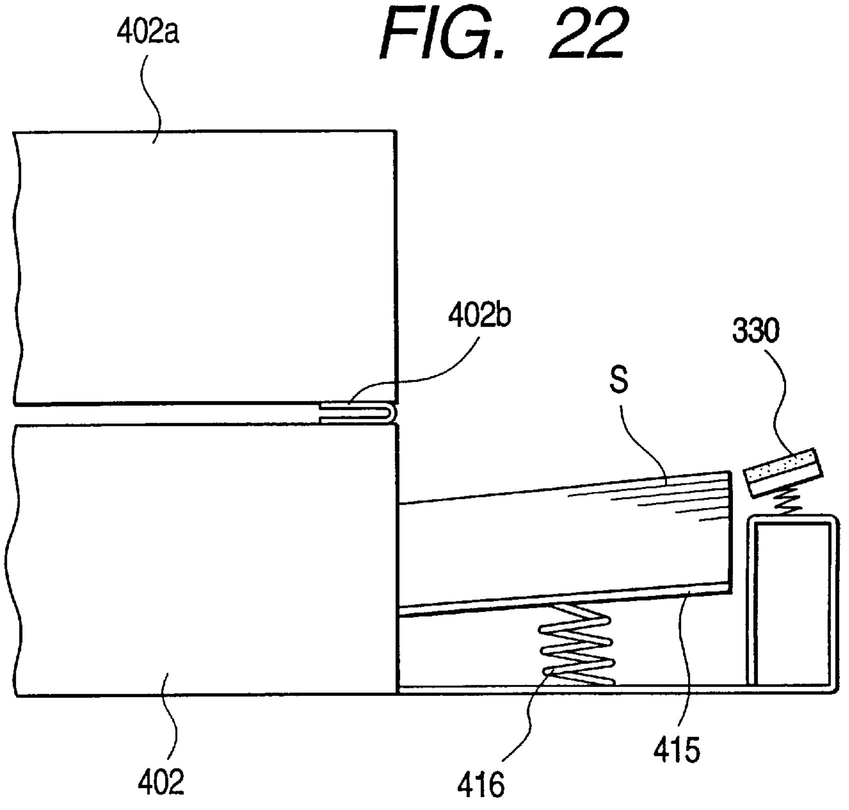
FIG. 22 is a side view showing another example of the separating means provided in the sheet pack.

Also, instead of the separating pawls 303, a separating inclined surface as indicated by the reference numeral 320 in FIG. 21 or a separating pad as indicated by the reference numeral 330 in FIG. 22 may be provided in the sheet pack 300 and used.

A description will now be made of means for informing the printer of sheet data recorded on the recording label.

An electric wave is transmitted at a constant cycle from a communication module provided in the interior of the printer 351 to thereby check up the presence or absence of the sheets S in the cassette 310. When the cassette 310 having the sheet pack 300 mounted therein is mounted on the printer 351, the recording label 355 comes into the range of detection of the antenna 362 and therefore, an MPU is operated by an electromagnetically induced electromotive force and effects a communicating using the electric wave by a predetermined protocol, and effects the exchange of predetermined data, whereby the microcomputer of the printer detects the sheets in the cassette 310.

The recording label 355 has written therein information including the kind of the sheets, the size of the sheets, the number of packed sheets, the date of manufacture, the date on which the first sheet was used, the number of remaining sheets which is the number of packed sheets minus the number of used sheets, etc. which are the data regarding the sheets. On the basis of this information, the printer 351 effects the setting of a printer driver so that during printing, printing can be effected on the sheet under optimum printing conditions. Also, each time it prints on a sheet, the printer 351 subtracts it from the number of remaining sheets during mounting, and writes it into the recording label 355. Thereby, the accurate number of remaining sheets can be counted. Further, the printer 351 writes into the recording label 355 whether this sheet was used and printing was done by the customization of the printing conditions, and what image or text was printed, whereby the printer can also reflect it in the next cycle of printing.

By the recording label 355 being thus stuck on the sheet containing container 302, the sheet can be simply mounted in the printer 351 bodily with the sheet pack 300 to thereby inform the printer 351 of the information regarding the sheet, and the exchange of the information can be effected between the printer 351 and the recording label 355 more simply and more accurately than the information of the sheet is memorized in the cassette 310.

The cassette lid 317 need not always be used. In that case, a hard sheet such as paper board or a plastic sheet may preferably be stuck on the inner side of the upper surface of the sheet containing container 302 to thereby reinforce the sheet containing container 302.

Figure 16:
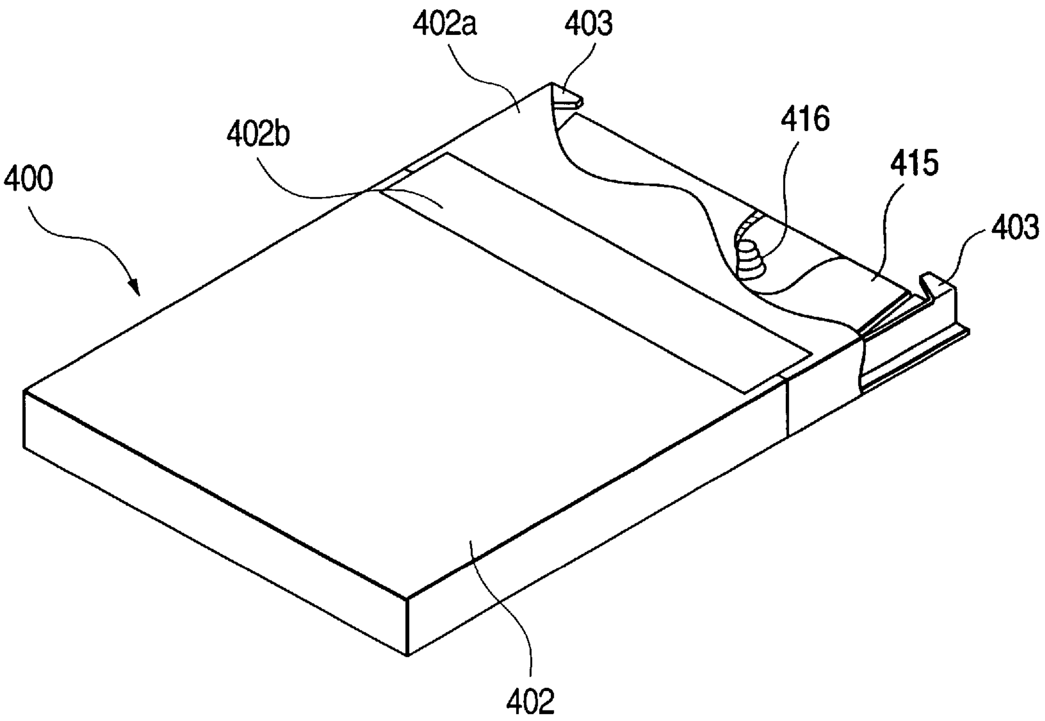
FIG. 16 is a perspective view of another embodiment of the sheet pack of the present invention.
Figure 17:
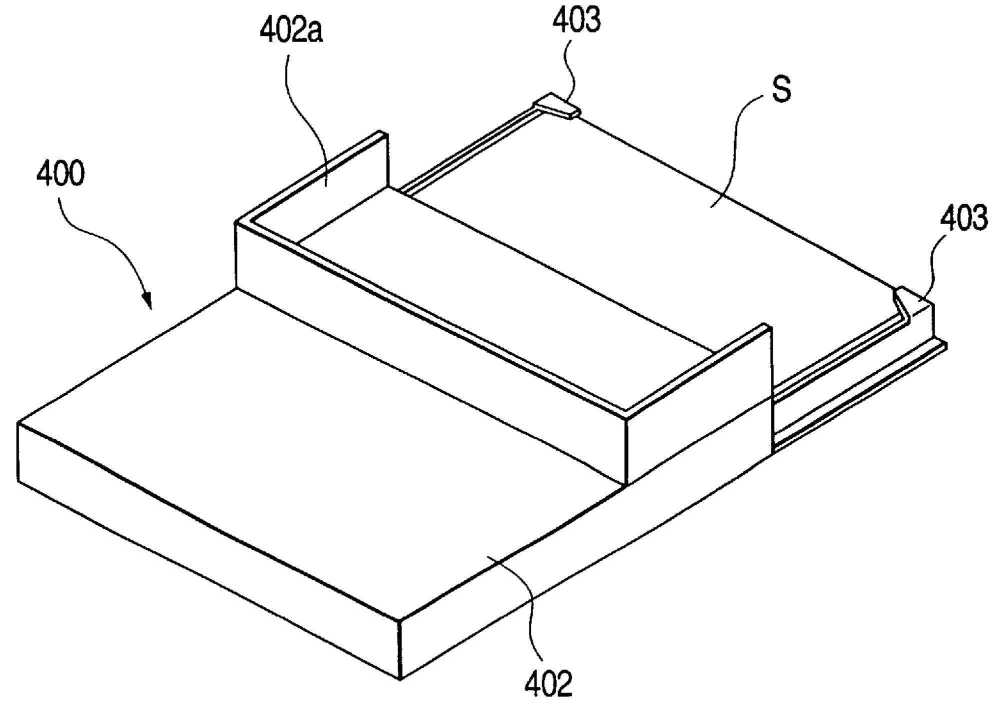
FIG. 17 is a perspective view showing the sheet pack of FIG. 16 in a state in which the lid thereof is opened.

FIGS. 16 and 17 are general perspective views of a sheet pack 400 according to another embodiment.

This sheet pack 400 is provided with a sheet containing container 402 as a sheet containing member formed into a box-like shape by thick paper such as paper board or corrugated cardboard, or a hard plate such as a plastic plate formed by a high polymer material such as vinyl chloride. The sheet containing container 402 has an openable and closable lid portion 402*a*. The lid portion 402*a* is attached to the sheet containing container 402 by a joint portion 402*b*. As the joint portion 402*b*, use is made of thin paper such as Japanese paper excellent in bending durability, or film of a high polymer material such as vinyl chloride.

A pressure plate 415 and a pressure plate spring 416 similar to the pressure plate 315 and the pressure plate spring 316, respectively, as shown in FIG. 14 are likewise provided in the sheet containing container 402.

Instead of using separating pawls 403 as sheet separating means, a separating inclined surface 320 may be provided on the leading end side of the sheets as shown in FIG. 21 and the sheets fed out may be applied to this separating inclined surface 320 to thereby separate the sheets one by one (inclined separation). Also, as shown in FIG. 22, a separating pad 330 may be provided on the leading end side of the sheets to thereby separate the sheets one by one.

The above-described sheet pack 400 with the lid portion 402*a* opened as shown in FIG. 17 can be intactly mounted on the printer 351. The sheet pack 400 is easy and simple to handle as compared with the above-described sheet pack 300 which is put into the cassette 314 and mounted on the printer 351.

The operation of the sheet pack 400 after mounted on the printer 351 is similar to that of the abovedescribed sheet pack 300. Also, the pressure force of the pressure plate 415 pressing the sheet against the sheet feeding roller 352 can be adjusted in accordance with the sheet and therefore, the reliability of sheet feeding can be further improved. Further, any preliminary cassette need not be prepared in the interchange or the like of the sheets, but each removed sheet containing container can be kept on a shelf or the like and therefore, the operability of the sheet interchange is improved very much.

Figure 18:
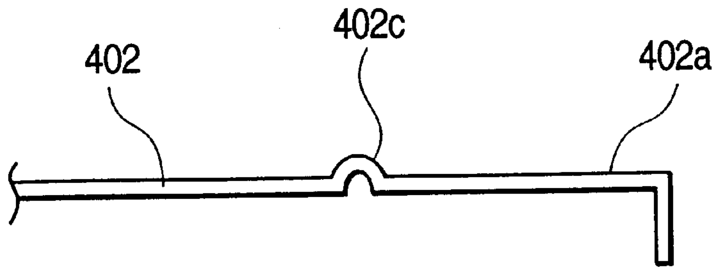
FIG. 18 is a fragmentary cross-sectional view of another sheet pack.

The joint portion, as shown in FIG. 18, may be a joint portion 402*c* formed convexly by embossing when the sheet containing container 402 is formed of paper board. In this case, the sheet containing container 402, the joint portion 402*c* and the lid portion 402*a* can be made integral with one another, and the bent position can be made accurate to thereby increase the degree of freedom of bending.

Figure 19:
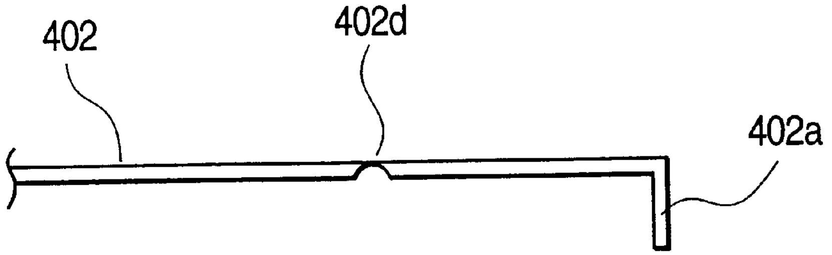
FIG. 19 is a fragmentary cross-sectional view of another sheet pack.

Also, the joint portion, as shown in FIG. 19, may be a joint portion 402*d* formed with a groove in the back surface thereof and having a thinned thickness when the sheet containing container 402 is formed by a plastic plate formed of a high polymer material such as vinyl chloride. Again in this case, the sheet containing container 402, the joint portion 402*d* and the lid portion 402*a* can be made integral with one another, and the bent position can be made accurate to thereby increase the degree of freedom of bending.

Figure 20:
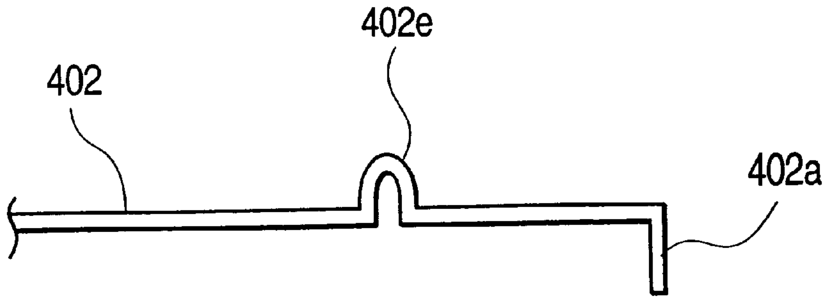
FIG. 20 is a fragmentary cross-sectional view of another sheet pack.

Further, the joint portion, as shown in FIG. 20, may be a thin joint portion 402*e* of an arcuate cross-sectional shape formed convexly when the sheet containing container 402 is a plastic plate. Again in this case, the sheet containing container 402, the joint portion 402*e* and the lid portion 402*a* can be made integral with one another, and the bent position can be made accurate to thereby increase the degree of freedom of bending.

Here, when the contained sheets are to be fed, it is generally necessary to establish the relation that (the coefficient of friction $\mu 1$ between the sheet supply roller 352 and the sheet )>(the coefficient of friction $\mu 2$ between a frictional member provided on the sheet stacking surface and the sheet)>(the coefficient of friction $\mu 3$ between the sheets).

If in the above-mentioned expression, $\mu 1$ is about 1.8 and $\mu 2$ is about 1.2, the separating roller can feed only a sheet of which the coefficient of friction $\mu$ is less than about 1.2. If $\mu 3$ is about 1.2 or greater, the sheets will be fed more than one sheet in unison, and if $\mu 2$ is about 1.8 or greater, the last sheet will not be fed ("the last sheet being not fed").

Now, if in any of the sheet containing container 302 and the sheet containing container 402, the lowermost sheet Sd is stuck on the sheet containing container 302 or the sheet containing container 402, there are the following advantages by the lowermost sheet being used instead of a friction pad.

In the present case, the lowermost sheet is fixed to the sheet containing container and therefore, the coefficient of friction $\mu 2$ therebetween is infinity, but the lowermost sheet is not fed out because it is stuck on the sheet containing container and therefore, the above-mentioned relation that $\mu 1 > \mu 2$ need not be satisfied, but it will be good if the relation that (the coefficient of friction $\mu 1$ between the separating roller and the sheet)>(the coefficient of friction $\mu 3$ between the sheets) is established. Thus, if in the aforedescribed example, the coefficient of friction $\mu 3$ between the sheets is less than about 1.8, sheet feeding can be done and the range of the sheets which can be fed will be markedly improved.

That is, the two great problems of "the last sheet being not fed" and "the last sheet being fed more than one sheet" which have heretofore been the greatest problems peculiar to the conventional automatic sheet feeding apparatus are overcome.

Further, even a sheet such as cloth having an uneven surface which has heretofore been difficult to feed becomes capable of being reliably fed by optimizing the amount of application and the angle of the separating pawls with respect thereto.

That is, optimum separating means matching the sheets is packed together with the sheets and therefore, the degree of allowance for the irregularity of the quality of the sheets is great, and the reliability of feeding can be secured.

Figure 23:
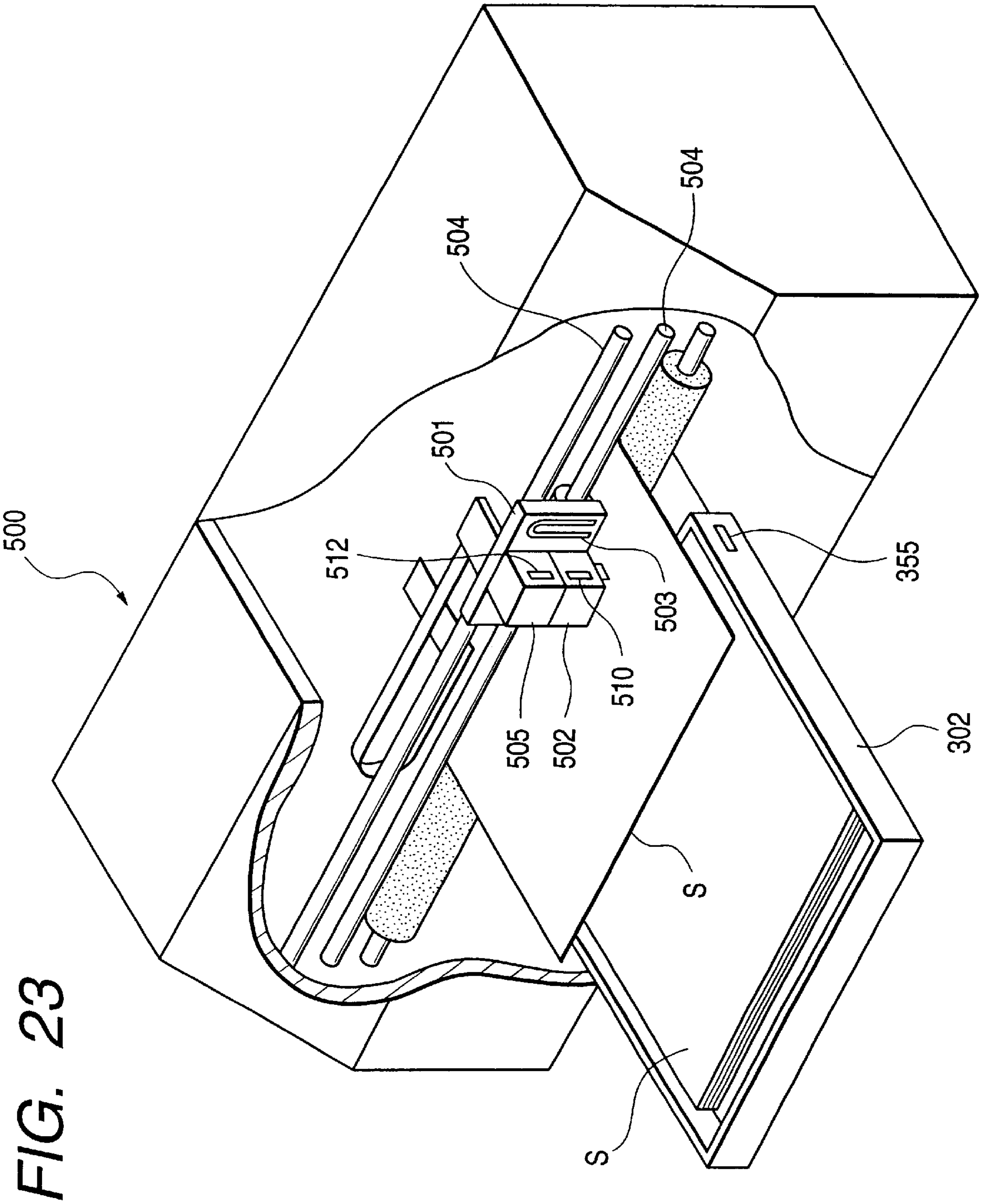
FIG. 23 is a perspective view of another embodiment of the printer.

FIG. 23 is a general perspective view of a printer 500 according to another embodiment.

In FIG. 23, the printer 500 is provided with a printing head 502 carried on a carrier 501 and movable in a sub-scanning direction. The carrier 501 is provided with an antenna 503 for effecting communication with the same recording label as the recording label 355 shown in FIG. 13. The carrier 501 and the antenna 503 are moved as a unit along guide shafts 504, 504.

The recording label 355 is stuck on a sheet containing container 302 for sheets S. Recording labels 510 and 512 are stuck on the printing head 502 and an ink tank cartridge 505, respectively. Inherent information is written in memory elements in the recording labels 510 and 512.

The information includes, for example, in the case of the printing head 502, the information of the arrangement accuracy of nozzles, the twist data of ink droplets in the direction of discharge, the drop data of ink droplets, the head driving conditions, the kind, date of manufacture, etc. of the head. In the case of the ink tank, the information includes the date of manufacture of ink, the kind of the ink, the filling amount of the ink, etc. In the case of the sheet containing container 302, the information includes the kind of the sheets, the size of the sheets, the kind of the ink receiving layer, the received amount of the ink, the number of contained sheets, the date of manufacture, etc.

The recording label 355 is capable of both writing and reading by an electric wave, and is adapted to be capable of writing thereinto not only initial information regarding the aforedescribed sheets, but also information changed during use, and is designed to be capable of always collecting the latest information on the printer side, and can improve the performance and reliability of the printer.

For example, in the case of the ink tank, when the recording label is used, the amount of ink used can be known by counting the frequency of discharge of the ink during printing, and if the amount of ink used is subtracted from the initial filling amount of ink, the amount of remaining ink is calculated and therefore, this amount of ink can be displayed on the display of the printer or a personal computer and also, periodical maintenance can be automatically done. Further, the information of the ink tank when carried on the printer is written back onto the ink tank side, whereby the history can be left even during the interchange of the ink tank or during the use of the ink tank in another printer and therefore, the accurate situation of use can be grasped on the printer side.

When the recording label is used, even in the case of the printer head, for example, the date of first use and the number of printed sheets are integrated to thereby effect image correction taking the deterioration or the like by the change with time or duration into account, whereby printing of high quality equal to that by a new printer head becomes possible. Also, the sequence of maintenance can be carried out in accordance with the history of use to thereby maintain the performance. Further, of course, the information of the sheets is adopted to effect the optimum control of printing, and by subtracting the number of sheets used, not only the number of remaining sheets is displayed, but an improvement in usability such as expediting the replenishment of sheets can be achieved when a contradiction to the indication of the number of printed sheets occurs.

The operation of the printer 500 of FIG. 23 will now be described.

Figure 24:
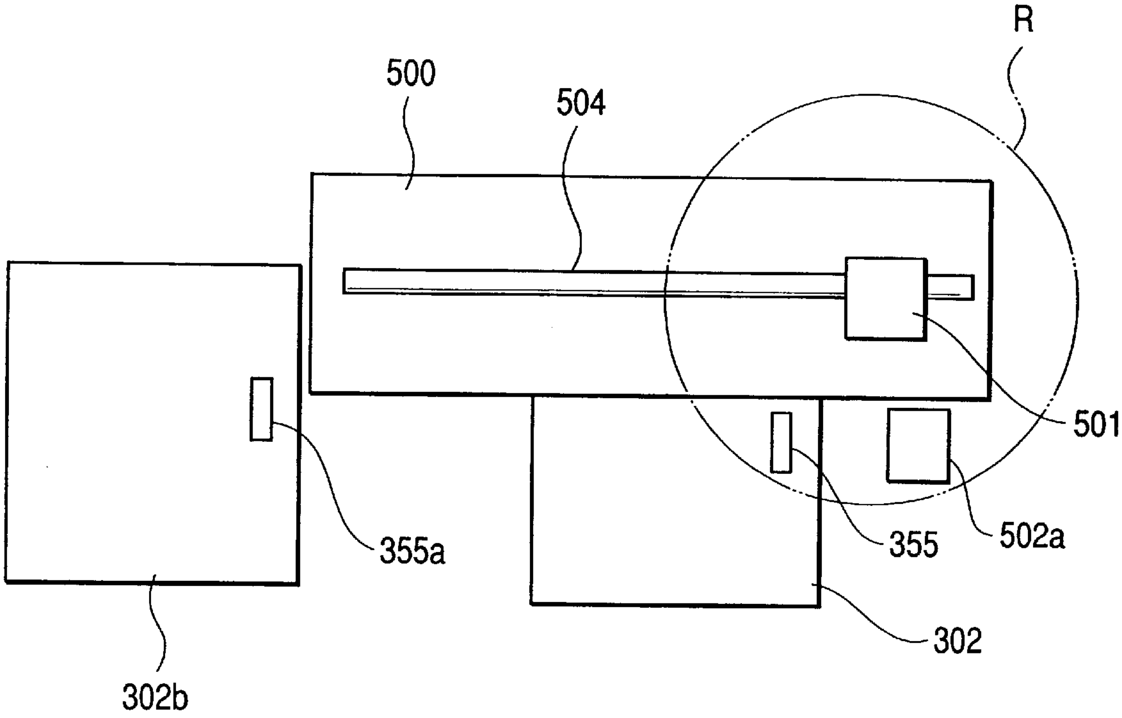
FIG. 24 is an illustration of the operation of the printer of FIG. 23.

In FIG. 24, an electric wave is emitted to a predetermined range R (e.g. a radius of 10 cm) by the antenna 503 carried on the carrier 501, and the recording label 355 which has entered the electric field thereof starts its operation by an electromagnetically induced electromotive force. In that case, if there is a printing head 502*a* (or an ink tank) removed from the printer 500 and placed outside the printer 500, the recording label of that printing head 502*a* which also has a recording label stuck thereon is also detected, and that printing head 502*a* cannot be distinguished from the printing head 502 mounted on the printer 500.

Figure 25:
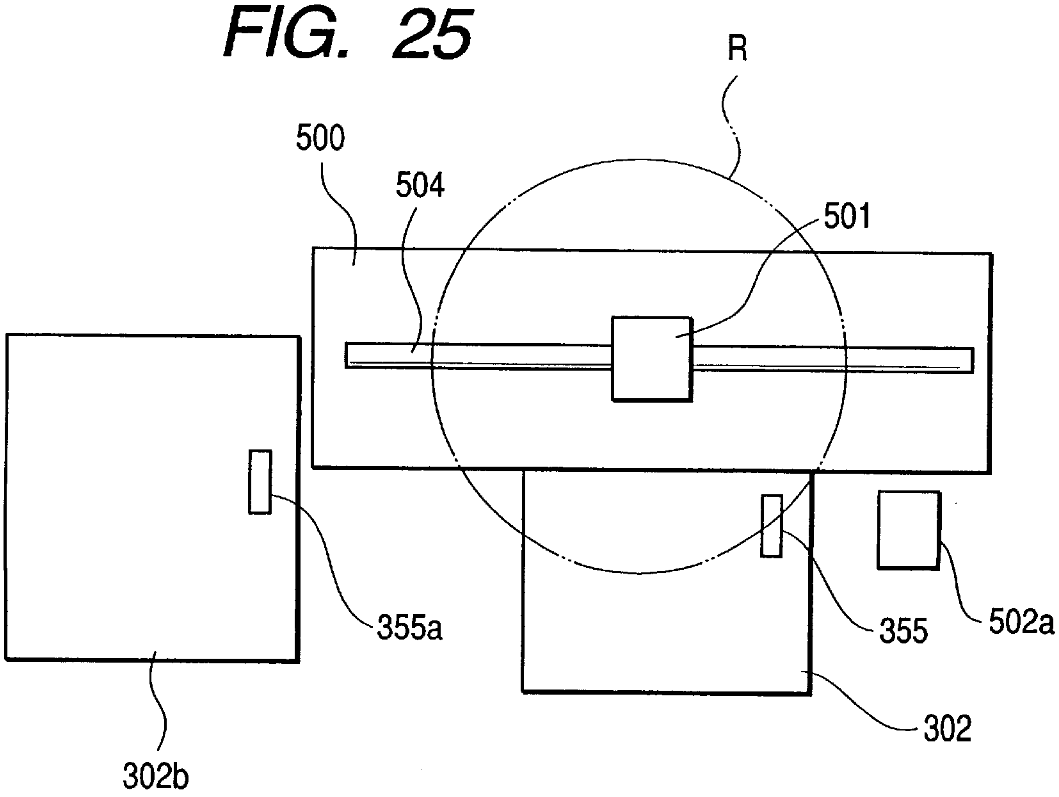
FIG. 25 is an illustration of the operation of the printer of FIG. 23.
Figure 26:
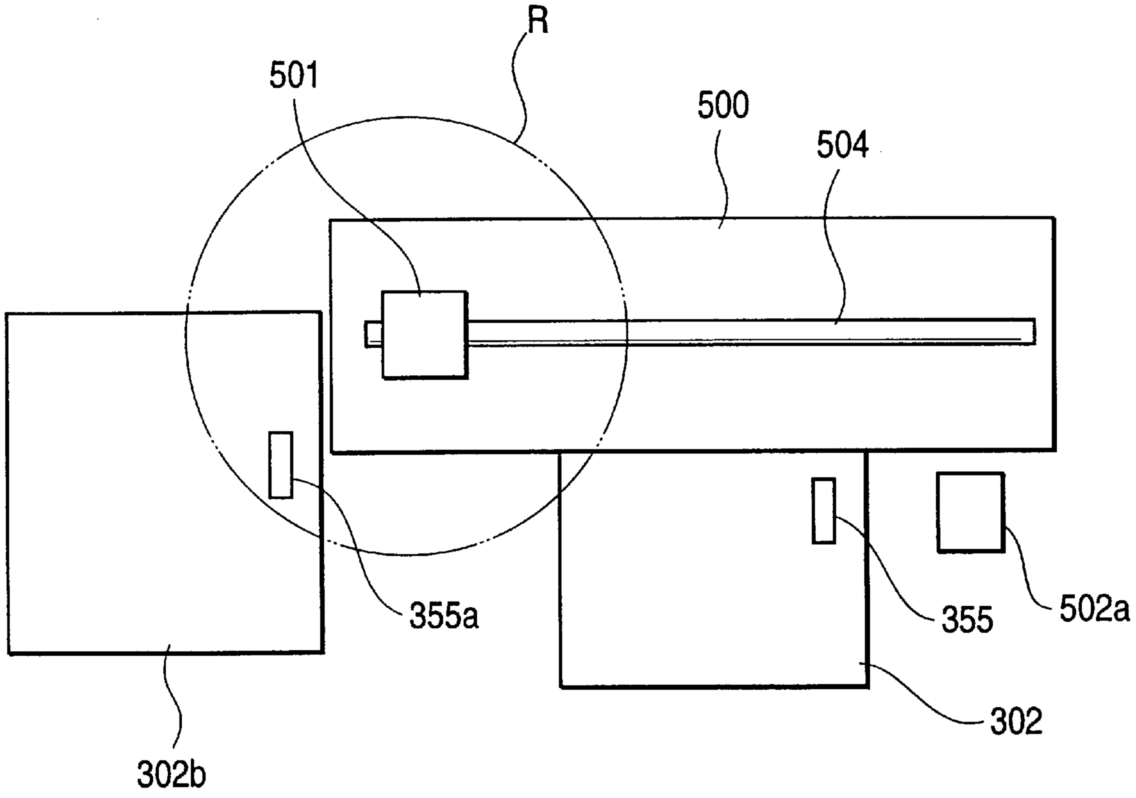
FIG. 26 is an illustration of the operation of the printer of FIG. 23.

So, by scanning the carrier 501 while emitting an electric wave from the antenna 503, the head 502 and ink tank 505 carried on the carrier are always detected, but the printing head 502*a* (or the ink tank) placed in proximity to the printer 500 becomes unrecognized in the course of scanning (FIGS. 25 and 26), and therefore that printing head 502*a* is judged to be "a printing head not mounted on the printer 500".

Also, in the case of the sheet pack, whether the sheet pack detected by the scanning of the carrier is the sheet pack mounted on the printer is judged easily. For example, the recording label 355*a* of the sheet containing container 302*b* placed outside the printer is detected only at a position shown in FIG. 26. Also, the recording label 355 of the sheet containing container 302 mounted on the printer 500 is detected only at a position shown in FIG. 24. Accordingly, whether the sheet pack is the sheet pack mounted on the printer can be judged from the positions at which the recording labels 355 and 355*a* are detected.

As described above, the recording label is detected while the carrier is scanned, whereby whether the sheet pack is one mounted on the printer can be judged and therefore, a wrong operation and the exchange and writing-in of wrong information can be prevented and the reliability of the operation is improved and also, the exchange of information with articles of consumption using an electric wave can be realized.

What is claimed is:

1. A sheet pack, mountable on a main body of a printing apparatus, the sheet pack comprising:

a box-shaped container for enveloping sheets to be supplied to the printing apparatus; and said container including at least two feeding ports for feeding the sheets to the printing apparatus; and the printing apparatus including sheet feeding means, wherein said sheet pack is mountable on the main body of the printing apparatus with different orientations of said sheet pack with respect to the main body of the printing apparatus, the different orientations corresponding to the at least two feeding ports.

2. A sheet pack according to claim 1, further comprising:

a first feeding port provided in one end of said container;

a first bearing port to provide access to said sheet feeding means for feeding the sheets from said first feeding port;

a second feeding port provided in an opposite end portion of said container from said first feeding port; and a second bearing port to provide access to said sheet feeding means for feeding the sheets from said second feeding port.

3. A sheetpack according to claim 2, further comprising a resilient member for biasing the sheets away from said first and second feeding ports.

4. A sheet pack according to claim 3, wherein said resilient member is a leaf spring bearing against the sheets.

5. A sheet pack according to claim 2, further comprising separating means for separating the sheets one by one, wherein each of said first and second feeding ports is provided with said separating means.

6. A sheet pack according to claim 5, wherein said separating means comprises a separating pawl.

7. A sheet pack according to claim 2, further comprising:

a first urging port for allowing an urging means for biasing the sheets against said sheet feeding means to bear against the sheets when said sheet feeding means is positioned at said first bearing port; and a second urging port for allowing said urging means to bear against the sheets when said sheet feeding means is positioned at said second bearing port.

8. A sheet pack according to claim 7, wherein said first bearing port and said first urging port are disposed on opposite sides of said sheet pack with respect to the sheets, and said second bearing port and said second urging port are disposed on opposite sides of said sheet pack with respect to the sheets, and said first urging port and said second urging port are disposed on a same side of said sheet pack with respect to the sheets.

9. A sheet pack according to claim 8, further comprising an urging plate, the urging plate being provided on the urging port side of the sheets, and wherein said urging means biases the sheets through said urging plate.

10. A sheet pack according to claim 1, further comprising:

a first feeding port provided at a location corresponding to an uppermost sheet of the sheets;

a first bearing port provided in an upper surface of said container to provide access to said sheet feeding means for feeding the sheets from said first feeding port;

a second feeding port provided at a location corresponding to a lowermost sheet of the sheets; and a second bearing port provided in a lower surface of said container to provide access to said sheet feeding means for feeding the sheets from said second feeding port.

11. A sheet pack according to claim 10, further comprising:

a first resilient member for biasing an uppermost surface of the sheets away from said first feeding port; and a second resilient member for biasing a lowermost surface of the sheets away from said second feeding port.

12. A sheet pack according to claim 11, wherein said first resilient member is a leaf spring bearing against and downwardly biasing the uppermost surface of the sheets, and said second resilient member is a leaf spring bearing against and upwardly biasing the lowermost surface of the sheets.

13. A sheet pack according to claim 10, further comprising:

a first urging port for causing first urging means for biasing the sheets against said sheet feeding means to bear against the sheets when said sheet feeding means is positioned at said first bearing port; and a second urging port for causing second urging means for biasing the sheets against said sheet feeding means to bear against the sheets when said sheet feeding means is positioned at said second bearing port.

14. A sheet pack according to claim 13, wherein said first bearing port and said second urging port are disposed at locations on the upper surface of said container which deviate widthwisely of the sheets, and said second bearing port and said first urging port are disposed at locations on the lower surface of said container which deviate widthwisely of the sheets.

15. A sheet pack according to claim 13, further comprising:

a first leaf spring bearing against and downwardly biasing an uppermost surface of the sheets; and a second leaf spring bearing against and upwardly biasing a lowermost surface of the sheets, wherein said first urging means biases the sheets through said first leaf spring, and said second urging means biases the sheets through said second leaf spring.

16. A sheet pack according to claim 1, further comprising:

a first feeding port provided in one end portion of said container;

a first bearing port to provide access to said sheet feeding means for feeding the sheets from said first feeding port;

a second feeding port provided in an end portion of said container which is orthogonal to the one end portion in which said first feeding port is provided; and a second bearing port to provide access to said sheet feeding means for feeding the sheets from said second feeding port.

17. A sheet pack according to claim 16, further comprising a resilient member for biasing the sheets away from said first and second feeding ports.

18. A sheet pack according to claim 17, wherein said resilient member is a leaf spring bearing against the sheets.

19. A sheet pack according to claim 16, further comprising:

a first urging port for causing urging means for biasing the sheets against said sheet feeding means to bear against the sheets when said sheet feeding means is positioned in said first bearing port; and a second urging port for causing the urging means to bear against the sheets when said sheet feeding means is positioned in said second bearing port.

20. A sheet pack according to claim 19, wherein said first bearing port and said first urging port are disposed on opposite sides of said sheet pack with respect to the sheets, and said second bearing port and said second urging port are disposed on opposite sides of said sheet pack with respect to the sheets, and said first urging port and said second urging port are disposed on a same side of said sheet pack with respect to the sheets.

21. A sheet pack according to claim 20, further comprising an urging plate, the urging plate being provided on the urging port side of the sheets, and wherein said urging means biases the sheets through said urging plate.

22. A printing apparatus having a main body, the apparatus comprising:

a sheet pack including a box-shaped container for enveloping sheets to be supplied to said printing apparatus;

sheet feeding means for feeding the sheets from said sheet pack; and printing means for printing images on the sheets fed by said sheet feeding means, wherein said sheet pack is mountable on the main body of said printing apparatus with different orientations of said sheet pack with respect to the main body of said printing apparatus, and wherein the container includes at least two feeding ports to said printing apparatus and a plurality of bearing ports through which said sheet feeding means is brought into contact with the sheets, and wherein the different orientations correspond to the at least two feeding ports.

23. A printing apparatus comprising:

a sheet pack having a box-shaped container for enveloping sheets to be supplied to said printing apparatus, the sheet pack including recording label means for writing and reading information regarding the sheets;

sheet feeding means for feeding the sheets from said sheet pack;

printing means for printing images on the sheets fed by said sheet feeding means;

recording label reading means for reading information on said recording label means; and means for electrically transmitting the information of said recording label means.

24. A printing apparatus according to claim 23, wherein said printing means has a printing head movable by a carrier, the printing head being associated with printing head label means for writing and reading information regarding the printing head, and the carrier including an antenna for transmission and reception.

25. A printing apparatus according to claim 24, further comprising an ink tank movable with said printing head, wherein the printing head label means is provided on said ink tank.

26. A printing apparatus according to claim 24, further comprising indication means for indicating the information of said recording label means and the information of said printing head label means.

* * * * *

UNITED STATES PATENT AND TRADEMARK OFFICE
CERTIFICATE OF CORRECTION

PATENT NO. : 6,246,466 B1
DATED : June 12, 2001
INVENTOR(S) : Hirofumi Hirano et al.

It is certified that error appears in the above-identified patent and that said Letters Patent is hereby corrected as shown below:

Title page, Item [54], and Column 1, line 1,
Title, "RECORDING" should read -- PRINTING --.

Column 1,
Line 45, "cumbersomeness" should read -- being cumbersome --.

Column 5,
Line 65, "sheet S fed" should read -- fed sheet S --.

Column 9,
Line 58, "ports," should read -- port, --.

Column 12,
Line 1, "feed," should read -- fed,--.
Line 14, "with" should be deleted.
Line 31, "up" should read -- on --.
Line 42, "the" (second occurrence) should be deleted.

Column 13,
Line 38, "abovedescribed" should read -- above-described --.

Column 14,
Line 35, "being not" should read -- not being --.

Column 15,
Line 4, "the" (second occurrence) should be deleted.
Line 7, "the" (third occurrence) should be deleted.

UNITED STATES PATENT AND TRADEMARK OFFICE

CERTIFICATE OF CORRECTION

PATENT NO. : 6,246,466 B1
DATED : June 12, 2001
INVENTOR(S) : Hirofumi Hirano et al.

It is certified that error appears in the above-identified patent and that said Letters Patent is hereby corrected as shown below:

<u>Column 16,</u>
Line 19, "and" should be deleted.
Line 39, "sheetpack" should read -- sheet pack --.

Signed and Sealed this

Sixteenth Day of April, 2002

*Attest:*

JAMES E. ROGAN
*Director of the United States Patent and Trademark Office*

*Attesting Officer*